(12) United States Patent
Elam et al.

(10) Patent No.: US 12,047,837 B2
(45) Date of Patent: Jul. 23, 2024

(54) MEDICAL DEVICE ALARM METHOD AND SYSTEM

(71) Applicant: Soundview Technology Solutions, Darien, CT (US)

(72) Inventors: Carl M. Elam, Perry, MD (US); H. Lee Browne, Greenwich, CT (US); David Schmidt, Darien, CT (US)

(73) Assignee: Soundview Technology Solutions, Darien, CT (US)

( * ) Notice: Subject to any disclaimer, the term of this patent is extended or adjusted under 35 U.S.C. 154(b) by 29 days.

(21) Appl. No.: 18/065,218

(22) Filed: Dec. 13, 2022

(65) Prior Publication Data
US 2023/0336942 A1 Oct. 19, 2023

Related U.S. Application Data

(60) Provisional application No. 63/289,121, filed on Dec. 13, 2021.

(51) Int. Cl.
*H04W 4/024* (2018.01)

(52) U.S. Cl.
CPC .................... *H04W 4/024* (2018.02)

(58) Field of Classification Search
CPC .......... H04W 4/024; H04W 4/23; H04W 4/33
See application file for complete search history.

(56) References Cited

U.S. PATENT DOCUMENTS

| | | | | |
|---|---|---|---|---|
| 11,480,687 | B1 * | 10/2022 | Salkini | G01S 19/05 |
| 2007/0001904 | A1 * | 1/2007 | Mendelson | G01C 21/206 |
| | | | | 342/450 |
| 2012/0064855 | A1 | 3/2012 | Mendelson | |
| 2015/0018011 | A1 * | 1/2015 | Mendelson | G01S 5/0226 |
| | | | | 455/456.3 |
| 2019/0212151 | A1 * | 7/2019 | Parker | G06F 9/453 |
| 2022/0283321 | A1 * | 9/2022 | Ng | G01S 5/14 |
| 2022/0382788 | A1 * | 12/2022 | Lee | G06F 16/955 |

OTHER PUBLICATIONS

International Search Report issued in corresponding PCT Application No. PCT/IB2023/051299, mailed Apr. 17, 2023, 3 pages.

* cited by examiner

*Primary Examiner* — Kashif Siddiqui
(74) *Attorney, Agent, or Firm* — Snyder, Clark, Lesch & Chung, LLP

(57) ABSTRACT

Signal monitoring devices may connect to a host system for establishing the location of radios and other wireless communication devices within a facility and additionally aiding in the navigation of radios and wireless devices within the facility. The signal monitoring devices may be installed and integrated as components of a host facility system such as a fire alarm system, intrusion alarm system, surveillance system, access control system, internet access Wifi system, facility computer system, multiple line telephone system, SCADA system or other facility systems. A system may include a cell phone, handheld radio, wireless medical device, or other personal wireless devices that transmit special signals that are received by signal monitoring devices and/or perform two way data communications with a signal monitoring device. A system may include a processor that creates route and guidance information to guide a wireless device or a radio user to a destination within a facility.

21 Claims, 23 Drawing Sheets

MEDICAL DEVICE ALARM METHOD AND SYSTEM

RELATED APPLICATIONS

This patent application claims priority to provisional U.S. Patent Application No. 63/289,121, filed Dec. 13, 2021, titled "Augmented Alarm Method and System," which is incorporated herein by reference.

This patent application also incorporates by reference the following applications: provisional U.S. Patent Application No. 62/055,320, filed Sep. 25, 2014; provisional U.S. Patent Application No. 62/138,824, filed Mar. 26, 2015; non-provisional U.S. patent application Ser. No. 14/866,351, filed Sep. 25, 2015; provisional U.S. Patent Application No. 63/244,048, filed Sep. 14, 2021; and non-provisional U.S. patent application Ser. No. 17/930,884, filed Sep. 9, 2022.

BACKGROUND

Field

One or more embodiments described below relate to emitter location systems and more particularly to cell telephone emitter location in an urban multipath environment.

BACKGROUND

The Federal Communications Commission (FCC) has described providing first responders with more precise locations for 911, 112, and other emergency calls from cell telephones or equivalent mobile telephone or internet calling devices in urban environments. In addition, there is both a general desire for and an FCC requirement for the cell telephone network within the United States to have the capability for precisely locating a cell telephone from which an emergency or distress call is being made. The ability to precisely locate emergency or distress calls is intended to allow first-responders to quickly aid the person or persons in distress even if they are not able to verbally communicate with authorities during the distress call.

SUMMARY

This disclosure describes a system comprising wireless devices e.g.: cell phones, smart phones, portable radios and wireless medical devices, that may operate in concert with a plurality of signal monitoring devices for the purpose of establishing the location of a wireless device within a building or facility. In addition, this disclosure describes the operation of the signal monitoring devices in conjunction with their host system processor to create route and guidance information for a wireless device user to utilize in navigating through a building or facility to a desired destination within the building or facility. These signal monitoring devices are integral components of a host building/facility system and in conjunction with the wireless devices, establish the location of said wireless devices within the building/facility. In one embodiment the host system may be a building monitoring system such as a SCADA, fire alarm, intrusion alarm, card access, computer network, internet access, surveillance and/or any other type building/facility system. The embodiment may comprise signal monitoring devices with a physical configuration and form factor similar to addressable smoke detectors within an addressable fire alarm system.

The host building system may have a processing component that can process the present location of a cell phone, wireless device or portable radio user along with a designated second location. The designated second location is a location to which the user wishes to travel, e.g. a cell phone or medical device user that is in distress. Alternatively, the designated second location may be the location of another wireless device user that has requested delivery of merchandise via an m-commerce voice call or via the internet. These locations may be inside or immediately outside the building or facility. The processing may derive a route (e.g., a preferred route) and create guidance information for the cell phone, wireless device or portable radio user to travel to the second location. The user may use the route and guidance information to follow from their present location to reach the other user at the designated second location. The host building system may also have a communications system interface for communicating location information to emergency responders and to m-commerce entities. The communications system and interface may include cellular and internet capabilities.

For one embodiment, each wireless device operates in concert with one or more signal monitoring devices by exchanging signals, generally RF signals but acoustic signals may also be used. This signal exchange between each wireless device and the signal monitoring devices may include: the identification of the wireless device and identification of the signal monitoring devices, signal metrics, location information and route and guidance information. For one embodiment, the location information exchanged between each wireless device and the signal monitoring devices may include location information for one or more nearby monitoring devices. For that embodiment, each wireless device may calculate its own location based upon location information provided by the one or more nearby monitoring devices.

The signals exchanged by the wireless devices and signal monitoring devices may generally be in addition to the signals the wireless devices exchange with their communications network such as a cellular network or a trunked radio system. For this reason, the signals are described as "special signals." These signals exchanged are initiated, in one embodiment, when the wireless device user is in distress. In this case, the signal exchange between a wireless device and the signal monitoring devices may additionally be described as "distress signals."

In another embodiment, these special signals exchanged may be initiated when a wireless device user wishes to establish the user's location within a building/facility in order to facilitate a commercial transaction. This may include establishing the user's location in order to facilitate a commercial delivery to the user's exact location. In this case the signals exchanged between a wireless device and the signal monitoring devices may be alternatively described as "location request signals" and "route and guidance information signals."

The distress signals, location request signals and route and guidance signals may conform to the Bluetooth, Wifi or other RF or acoustic signal standards. The specific choice of signals to be used and the frequencies of those signals and their encoding may be determined by Federal Communications Commission (FCC) regulations and industry standards.

Systems and methods described herein may be used for the locating of wireless devices in urban buildings and facilities for the following reasons. In outdoor and especially in open terrain, satellite based Global Positioning System (GPS) signals may be used to locate a wireless device user to within a few feet. In urban areas, however, particularly those with high-rise buildings, GPS location technology may be seriously degraded and may not permit first responders to locate a call in these areas and also may not permit a commercial delivery to an exact location. The impediment is the numerous reflections of the GPS signals from the many tall buildings surrounding a caller. These reflected GPS signals may arrive at any cell phone or other wireless device with different time delays from the actual or theoretical line of sight signals from the GPS satellites to the wireless device. These reflections provide deception for a cell phone attempting to calculate its location. While it may be possible to utilize GPS to locate a cell phone user on streets and other open spaces between buildings, GPS signals are not reliable for locating a cell phone user located inside an urban building and facility.

DETAILED DESCRIPTION

Part 1: Description of Emitter Location Techniques

Open Terrain Signal Location

Figure 1:
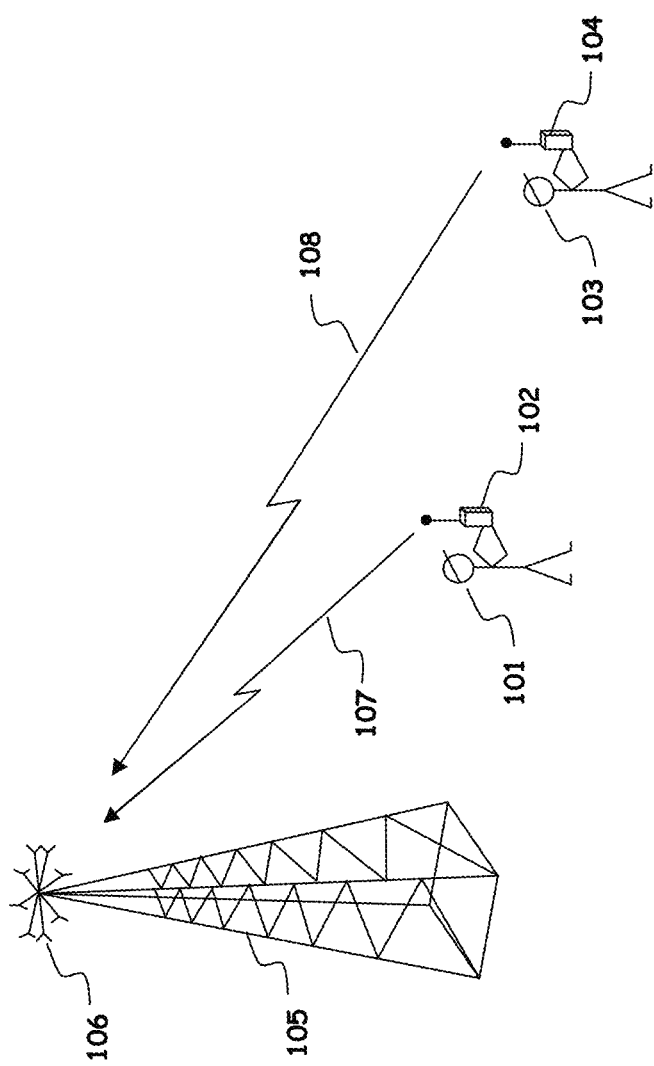
FIG. 1 illustrates a Cell Tower Sectors and AGC Emitter Location Technique.

Location technology gives first responders some ability to locate a call (e.g., mobile device) in open terrain. The enabling technologies in this scenario may include direction of arrival and signal strength. In open terrain, cell tower coverage may be reduced and therefore there may not be more than one tower available to facilitate geolocation and/or triangulation. FIG. 1 illustrates this condition. In this drawing, a first cell phone user 101 with cell phone or other wireless device 102 and second cell phone user 103 with cell phone 104 are both communicating with an emergency call center through the cell tower 105 with antenna array 106 located on the tower 105. Cell phone 102 radiates a RF signal 107 to the tower 105. Cell phone 104 radiates a RF signal 108 to the tower 105. The antenna array 106 on tower 105 is illustrated with eight directional antenna elements. Each element covers a 45-degree sector about the tower 105. Cell tower 105 may determine the antenna sector being used for each cell phone user and also permits the cell tower 105 to determine the signal strength of each signal 107 and 108 being received. This information allows the cell tower system to determine the approximate direction and distance of user 101 and user 103 from the tower 105.

Suburban Signal Location

Figure 2:
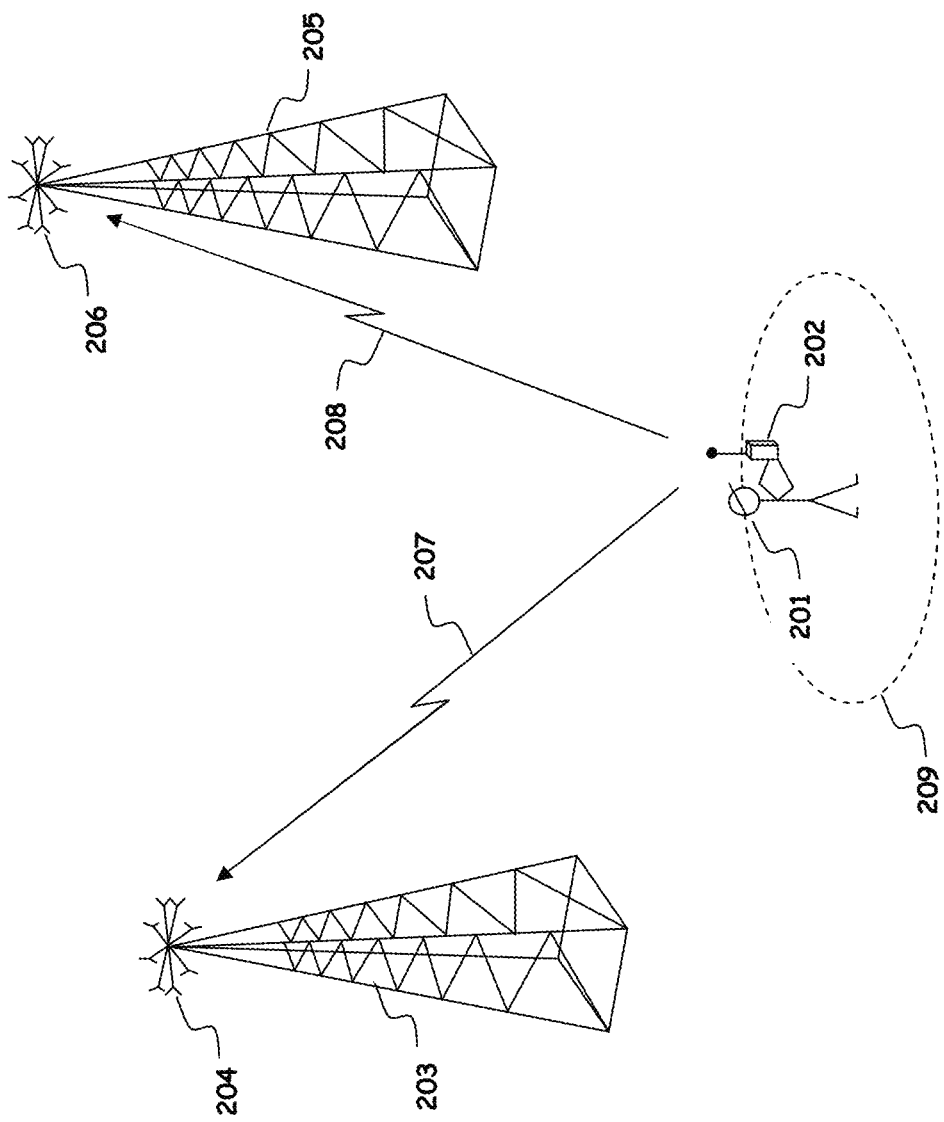
FIG. 2 illustrates a Cell Tower Triangulation Emitter Location Technique.

Location technology also permits first responders some ability to locate a call in suburban areas. The enabling technologies in this scenario may include direction of arrival, triangulation, geolocation, multilateration and/or signal strength. In suburban areas, cell tower coverage may be plentiful and therefore there may be two or more towers available to facilitate triangulation and/or multilateration. FIG. 2 illustrates this condition. In this drawing, cell phone user 201 with cell phone or other wireless device 202 is communicating with an emergency call center through the cell tower 203 with antenna array 204 located on the tower 203. Cell phone 202 radiates an RF signal 207 to the antenna array 204 on tower 203. Cell phone 202 also radiates an RF signal 208 to the antenna array 206 on tower 205. The antenna arrays 204 and 206 on towers 203 and 205 are illustrated with eight directional antenna elements. Each antenna element covers a 45-degree sector about tower 203 and about tower 205. The cell tower 203 antenna array 204 may determine the respective antenna sector being used to receive the RF signal 207 from the cell phone 202. The cell tower 205 antenna array 206 may determine the respective antenna sector being used to receive the RF signal 208 from the cell phone 202. This information allows the cell tower system to determine the area of intersection 209 of the antenna sectors from antenna array 204 and antenna array 206. The area of intersection 209 establishes the approximate location of user 201 with cell phone 202 relative to the location of tower 203 and tower 205. Cell tower 203 and tower 205 may also determine the signal strength of signals 207 and 208. The signal strength information may further aid in more precisely locating the cell phone user 201 with cell phone 202.

Urban Signal Location

In urban areas, particularly those with high-rise buildings, location technology may be seriously degraded and may not permit first responders to locate a call in these areas. The enabling technologies in this scenario may include antenna sector direction of arrival, triangulation and signal strength. In urban areas, cell tower coverage may be plentiful and therefore there may likely be two or more towers available to facilitate triangulation. The impediment, however, is the numerous reflections of the cell telephone's signal from the many tall buildings surrounding the caller. These reflected signals may arrive at any cell tower at different angles from the actual signal from the cell phone itself. These reflections may deceive the cell towers attempting to triangulate the cell phone location or even provide deception for cell towers attempting to simply determine the direction of arrival of the cell phone signal.

Figure 3A:
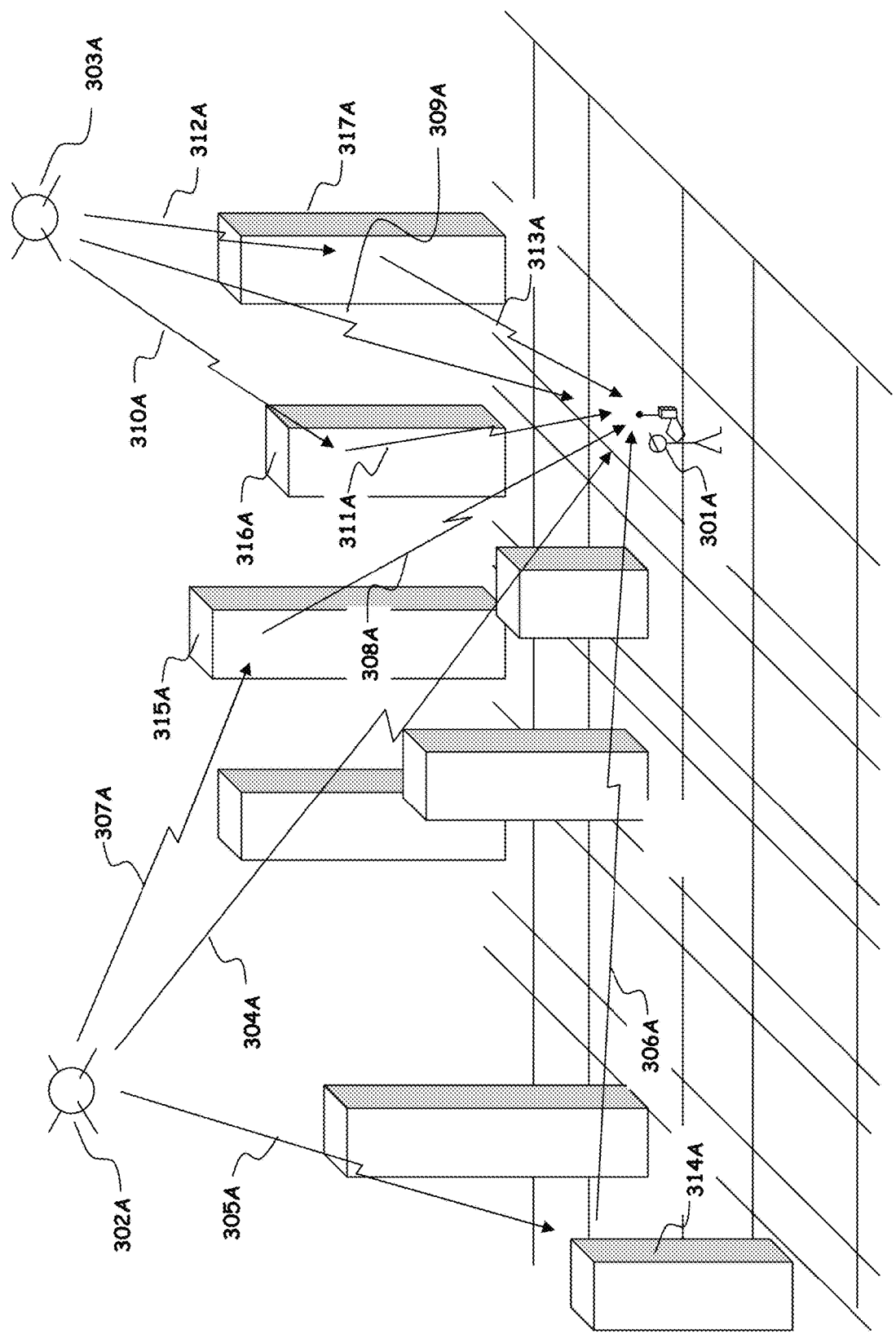
FIG. 3A illustrates a Street Level GPS Location Problem.
Figure 3B:
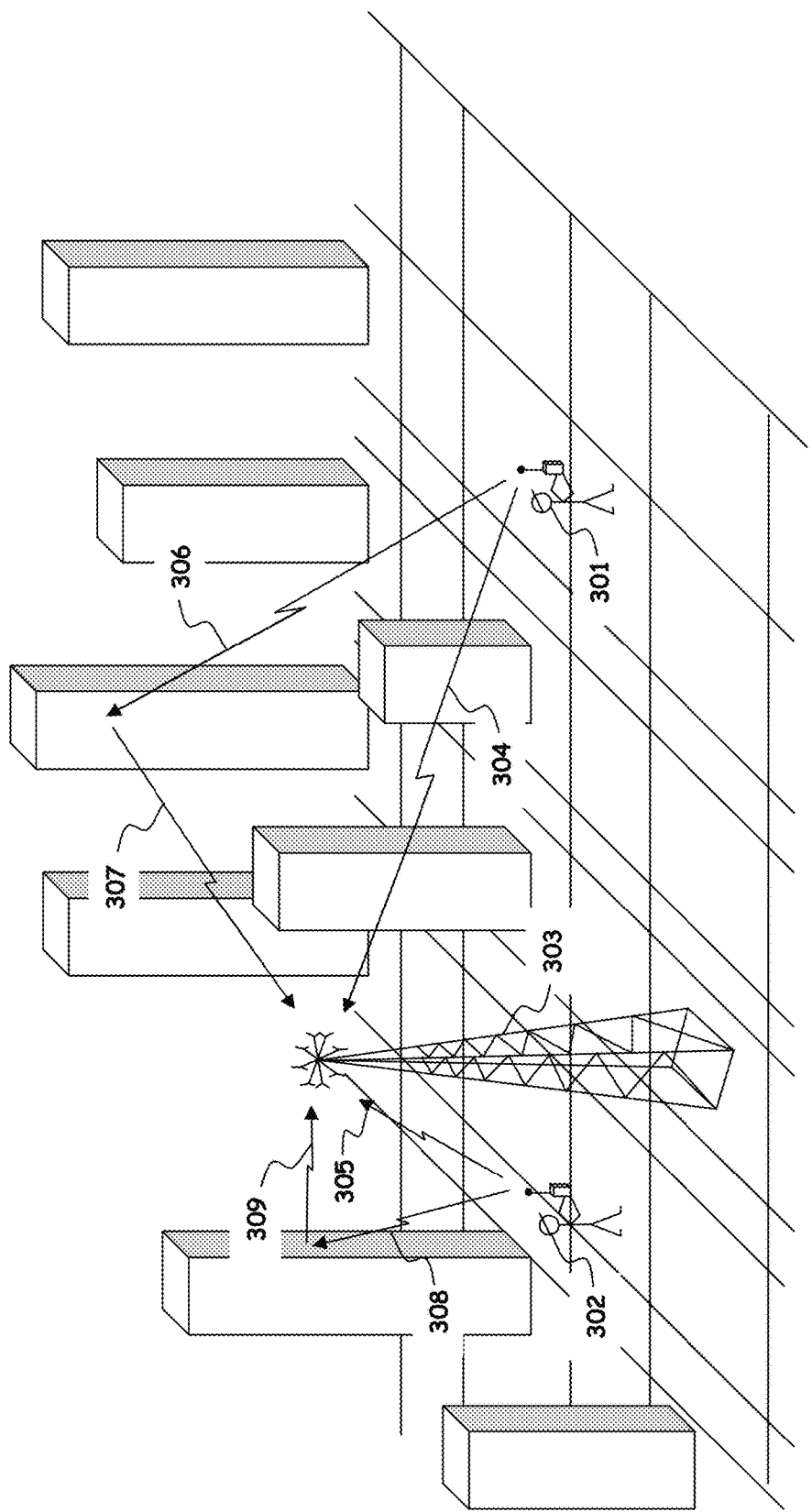
FIG. 3B illustrates a Street Level Signal Propagation Problem.

FIG. 3B illustrates the condition of a single cell tower receiving numerous reflections of cell phone signals being reflected from nearby buildings. In this drawing, a first cell phone user 301 with a cell phone or other wireless device and a second cell phone user 302 with a cell phone are both communicating with an emergency call center through the cell tower 303 with an antenna array located on the tower. The cell phone at first user 301 radiates a direct RF signal 304 to the antenna array on tower 303. The cell phone at first user 301 also radiates indirect RF signals 306 and 307 to the antenna array on tower 303. RF signals 306 and 307 reflect off a nearby building and arrive at the antenna array on tower 303 at a different angle from the direct RF signal 304. The cell phone at the second user 302 radiates a direct RF signal 305 to the antenna array on tower 303. The cell phone at second user 302 also radiates indirect RF signals 308 and 309 to the antenna array on tower 303. RF signals 308 and 309 reflect off a nearby building and arrive at the antenna array on tower 303 at a different angle from the direct RF signal 305. The antenna array on tower 303 is illustrated with eight directional antenna elements. Each element covers a 45-degree sector about the tower 303.

The cell tower 303 may determine the antenna sector being used for each cell phone RF signal being received. However in this illustration, the cell tower 303 sees two RF signals from each cell phone user. The tower sees two RF signals 304 and 307 from cell user 301 and the tower sees two RF signals 305 and 309 from cell user 302. If the two RF signals from user 301 are relatively equal and arrive at different antenna sectors, it may be difficult to establish the direction of the user 301 with respect to cell tower 303. Likewise, if the two RF signals from user 302 are relatively equal and arrive at different antenna sectors, it may be difficult to establish the direction of the user 302 with respect to cell tower 303. If a second cell tower is located nearby, it may experience the same difficulty with reflected RF signals from each cell user. As a result of these circumstances, an attempt of signal triangulation by two cell towers may not provide useful cell phone location relative to the cell towers.

Signal Location Techniques

The use of direction of arrival, signal strength, and triangulation are useful cell phone location techniques that take advantage of data parameters that are already available in existing cell telephone network architectures. The data parameters may include the signal strength required (or used) to communicate with nearby cell phones and the sectorial antenna that receives the strongest signal from each cell phone.

Direction of Arrival and Signal Strength

The direction of arrival technique is based upon the use of a single cell tower with many sectorial antennas installed on the tower. In the case of eight sectors, for example, each of the eight antennas (each a stacked array) may subtend a horizontal coverage arc of 45-degrees. The direction of arrival technique may be used effectively in desolate open terrain where a person with a cell phone and perhaps driving an automobile or in a house may be identified. Other arc coverage is possible, such as 120 degrees, even with three or more (e.g., eight) antennas. The cell tower may establish the direction of arrival for a specific cell phone by determining which sectorial antenna requires (or may use) the least signal power to communicate with the cell phone.

The use of direction of arrival coupled with signal strength may permit estimating the distance in a particular sector from a single cell tower to the cell phone user. This technique may improve the ability to more rapidly locate the cell phone user. FIG. 1 illustrates this condition. The cell tower may establish the distance for a specific cell phone by measuring the signal strength required (or used) to communicate with the cell phone and comparing that measurement with a database.

Signal Triangulation

Triangulation may use two or more cell towers (or receivers) that can receive the cell phone signal. These cell towers may each be equipped with sectorial antennas. When an emergency cell phone call is made, both cell towers may be instructed by a system operator or automatically to record and report the respective sectors in which each cell tower receives the distress call. The system operator or the system software may then determine the map coordinates at which the two cell tower sectors intersect. The area of intersection specifies the location of the cell phone. The area specified could however be quite large if the sectors intersect a mile or more from the towers. FIG. 2 illustrates this condition.

Signal Time Difference of Arrival

Figure 4:
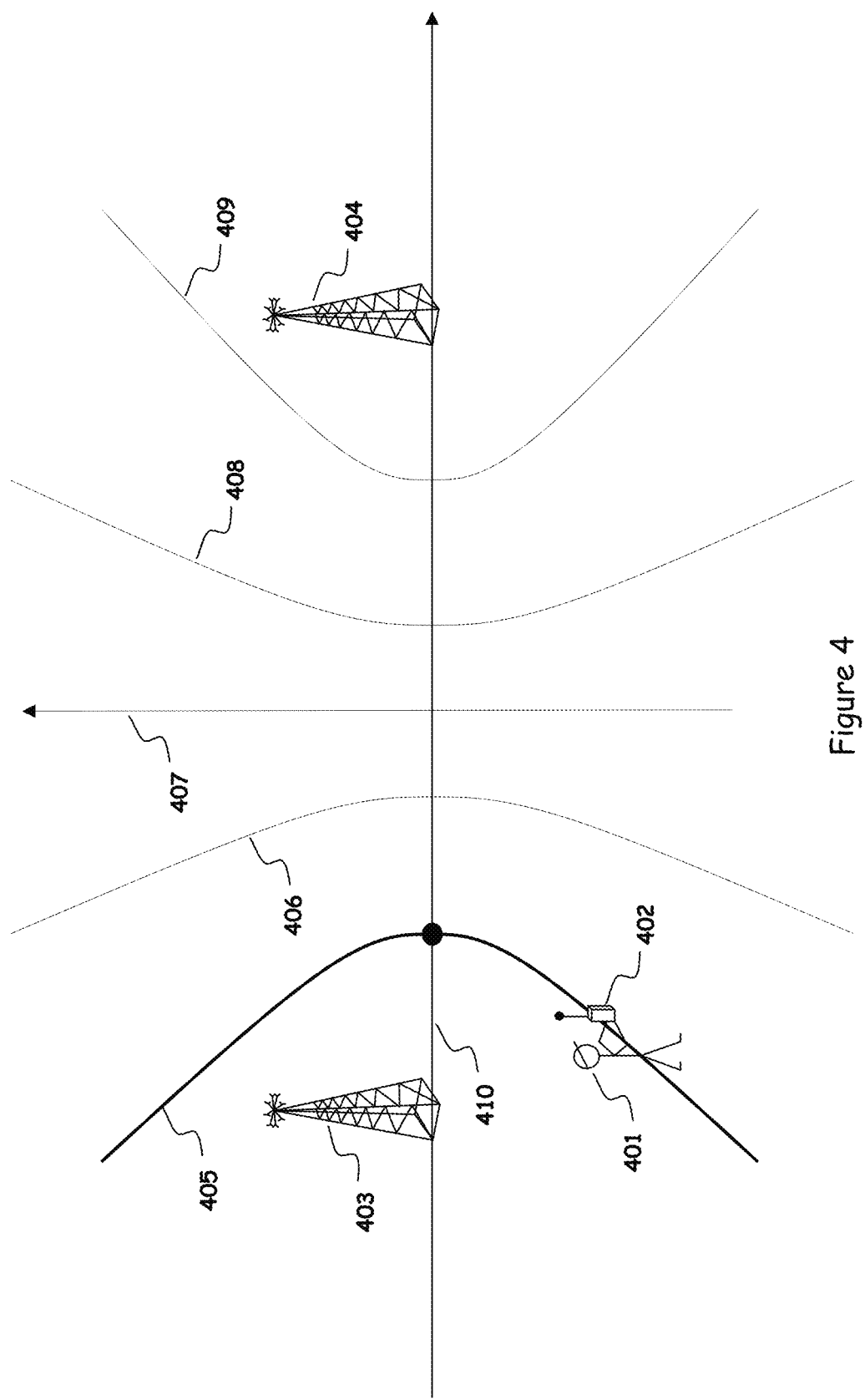
FIG. 4 illustrates a Two Cell Tower TDOA Emitter Location Technique.

Another emitter location technique to improve the resolution of location (e.g., within a football field length or about 300 feet) is that of Time Difference of Arrival (TDOA). This technique can be applied to signals that can be received by two cell towers. With TDOA, both cell towers may each calculate (e.g., accurately) the time (within approximately 300 nanoseconds) that a specific event (arrival of a designated data synchronization bit) occurs within a particular cell phone signal received at both towers. FIG. 4 illustrates this condition. In FIG. 4, cell phone user 401 with cell phone or other wireless device 402 is communicating with an emergency call center through the cell tower 403 with an antenna array located on the tower 403. Cell phone 402 radiates an RF signal to the antenna array on tower 403. Cell phone 402 also radiates an RF signal to the antenna array on tower 404. The antenna arrays on towers 403 and 404 are illustrated with eight directional antenna elements. Each antenna element covers a 45-degree sector about tower 403 and about tower 404. Implementation of TDOA permits the cell tower 403 antenna array and cell tower 404 antenna array to determine the relative time of arrival of the RF signal radiating from the cell phone 402. The two cell towers 403 and 404 may determine the relative time of arrival by comparing the arrival time of a specific bit of information within the cell phone RF signal with a national standard time reference that resides at each cell tower location.

FIG. 4 illustrates two cell towers 403 and 404 separated by an arbitrary distance along the line 410; let that arbitrary distance be 5,000 feet. The curved lines 405, 406, 407, 408 and 409 are hyperbolic curves that represent the locus of points along which a cell phone RF signal have a constant time difference of arrival at the two cell towers 403 and 404. Since the line 407 is halfway between the two towers, the time difference of arrival is be zero for an RF signal from a cell phone anywhere along this line 407. The dark line 405 intersects line 410 about 1,000 feet from tower 403 and about 4,000 feet from tower 404. An RF signal travels about one foot per nanosecond, therefore a cell phone signal at the intersection takes 1,000 nanoseconds to travel to tower 403 and takes 4,000 nanoseconds to travel to tower 404. The time difference of arrival is 3,000 nanoseconds assuming time at tower 403 is subtracted from time at tower 404. Therefore anywhere along the dark line 405 the time difference of arrival is 3,000 nanoseconds. So if the measured time difference of arrival of the time at tower 404 minus the time at tower 403 is equal to 3,000 nanoseconds, the system may predict that the cell phone lies somewhere along the dark line 405 that represents a TDOA of 3,000 nanoseconds.

To resolve the ambiguity of where the cell phone is located along the line 405, the closer cell tower 403 may also utilize the angle of arrival sector.

Figure 5:
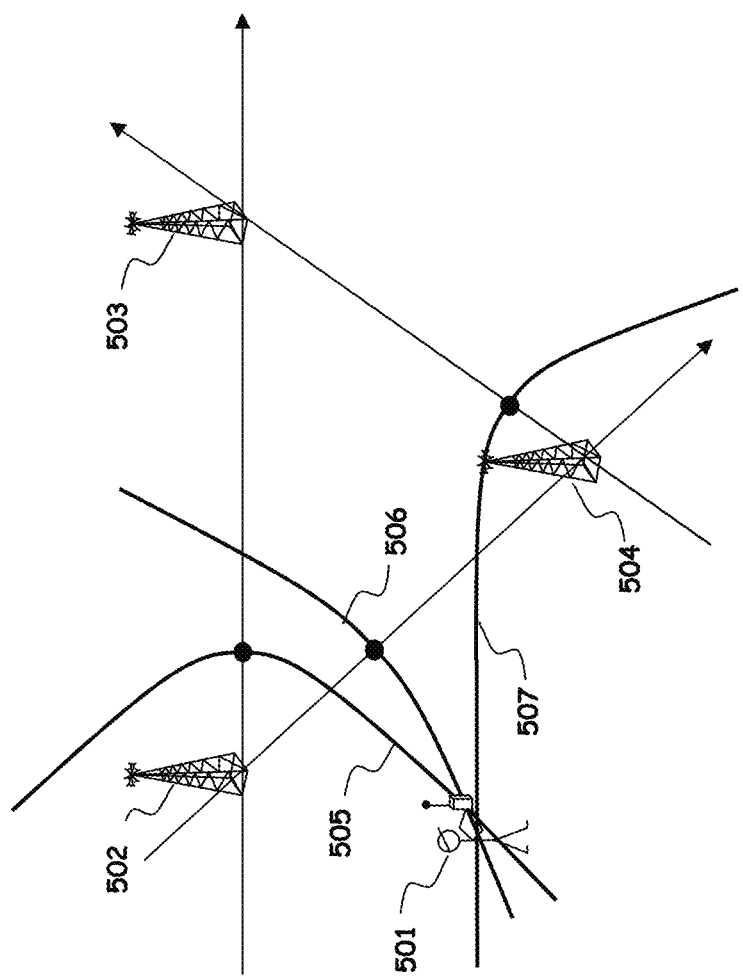
FIG. 5 illustrates a Three Cell Tower TDOA Emitter Location Technique.

The TDOA technique may be used to greater advantage if three cell towers are available as illustrated in FIG. 5. In this drawing, cell phone user 501 with a cell phone or other wireless device is communicating with an emergency call center through the cell tower 502 with an antenna array located on the tower. The cell phone at 501 radiates an RF signal to the antenna array on tower 502. The cell phone at 501 also radiates an RF signal to the antenna arrays on cell tower 503 and cell tower 504. The antenna arrays on towers 502, 503 and 504 are illustrated with eight directional antenna elements. Each antenna element covers a 45-degree sector about each tower. This TDOA implementation may permit the cell tower 502, cell tower 503 and cell tower 504 to determine the relative time of arrival of the RF signal radiating from the cell phone at user 501. The three cell towers 502, 503 and 504 determine the relative time of arrival by comparing the arrival time of a specific bit of information within the cell RF signal with a national standard time reference that resides at each cell tower location.

The dark curved lines 505, 506 and 507 are hyperbolic curves that represent the locus of points along which a cell phone RF signal have a constant time difference of arrival at the three cell towers 502, 503 and 504. The dark curved line 505 is the hyperbolic curve that represents the locus of points along which the cell phone may be located based upon the cell phone signal TDOA between the two cell towers 502 and 503. The dark curved line 506 is the hyperbolic curve that represents the locus of points along which the cell phone may be located based upon the cell phone signal TDOA between the two cell towers 502 and 504. The dark curved line 507 is the hyperbolic curve that represents the locus of points along which the cell phone may be located based upon the cell phone signal TDOA between the two cell towers 503 and 504. The actual location of the cell phone user 501 may be established by finding the intersection of the three dark lines 505, 506 and 507. An estimate may be found by using two of these dark lines but three (or any number) may be used if available.

Global Position System

Another emitter location technique to improve the resolution of location is the satellite based Global Positioning System (GPS). This technique can locate a cell phone to within a few feet in open terrain. The GPS location scheme operates by first allowing a cell phone to receive GPS signals from two or more GPS satellites. The cell phone processes the satellite signals and calculates the phone's location in geo-coordinates. When the cell phone is used to make an emergency call to a 911 call center, the cell phone may automatically report its geo-location to the emergency 911 call center. In an urban high multipath environment, however, the GPS system signals may be reflected or blocked and therefore may not permit a cell phone to accurately calculate its location and therefore the phone may not report an accurate geo-location.

FIG. 3A illustrates a cell phone user 301A in an urban environment. FIG. 3A also illustrates two GPS satellites 302A and 303A and their respective RF signals being received by the cell phone user 301A. The cell phone receives a direct signal 304A from GPS satellite 302A along with RF signals 305A and 306A that are reflected from building 314A and RF signals 307A and 308A that are reflected from building 315A. The cell phone also receives a direct signal 309A from GPS satellite 303A along with RF signals 310A and 311A that are reflected from building 316A and RF signals 312A and 313A that are reflected from building 317A. The cell phone may process the GPS signals but may calculate a geo-location that may have a larger error compared with an open terrain calculation.

Wi-Fi and Bluetooth

Other emitter location techniques may overcome the urban multipath problems for both outdoor and indoor wireless devices. One such technique includes the adaptation of local Wi-Fi systems to perform signal strength measurements and TDOA measurements. This may permit approximate emitter location within buildings and in public spaces outdoors. Another technique is that of the adaptation of Bluetooth devices to identify nearby cell phones and other wireless devices, based upon signal strength, thus enabling the approximate location of those devices to be established. Both of these techniques, however, may have location errors due to localized multipath and uncertain signal attenuation caused by walls and other metal objects within their vicinity.

The preceding emitter location techniques are somewhat effective in open terrain and in suburban settings but they become less effective in dense urban areas where tall buildings cause signal multipath of a magnitude that rivals that of a cell phone's direct path signal. FIG. 3B illustrates this condition.

Part 2: Hotel and Factory

Signal Location Using Building Systems

Figure 6:
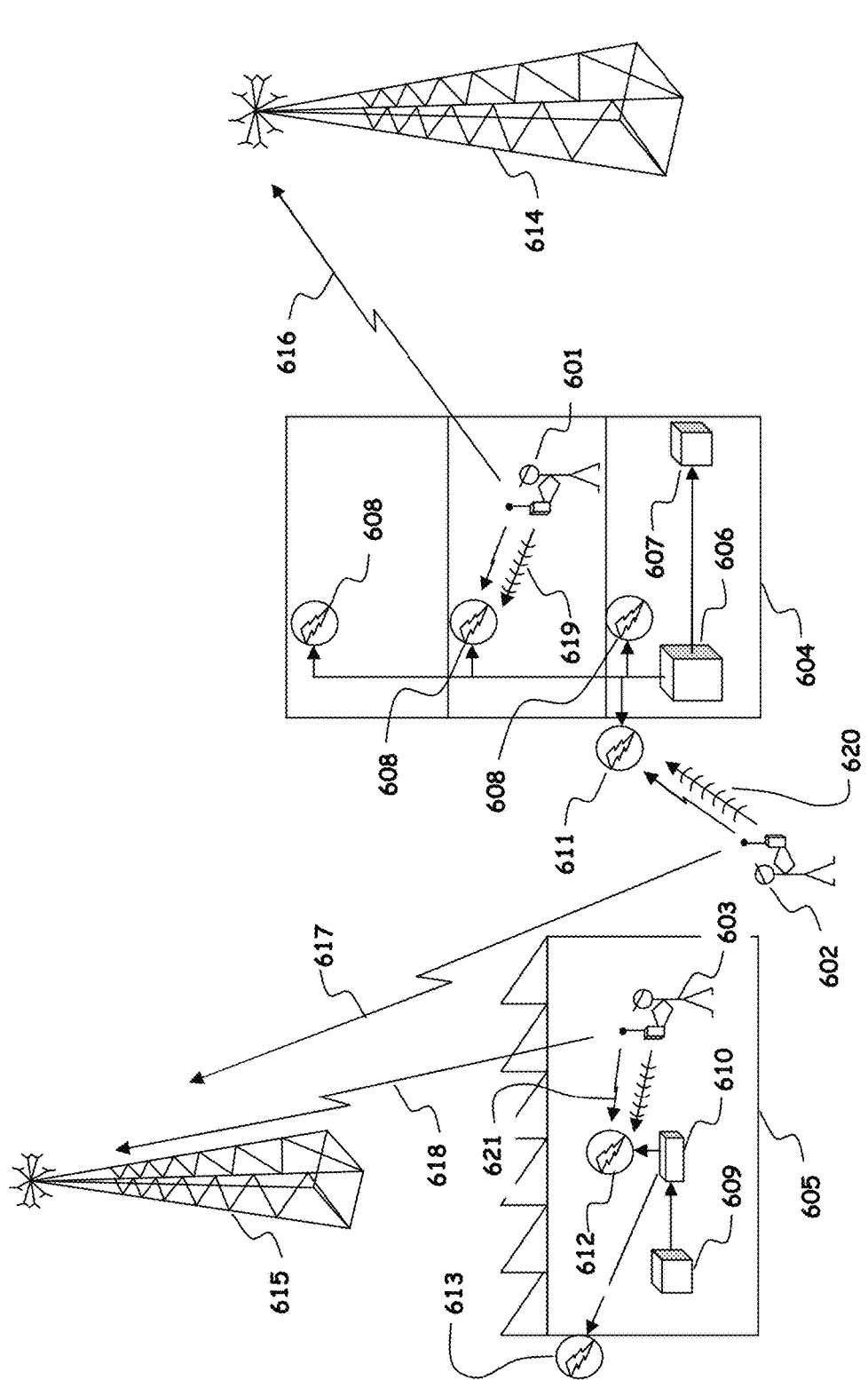
FIG. 6 illustrates Internal Building Signal Propagation.

One embodiment augments a Fire Alarm System, security system, access system, SCADA system or other building and facility monitoring and data systems with the ability to detect and locate a 911 or other emergency call from a cell telephone or other personal mobile communication device. To achieve this feature, the fire alarm system or other connected systems may be equipped with special 911 signal monitoring devices. FIG. 6 illustrates this configuration. FIG. 6 illustrates two cell towers 614 and 615. Also illustrated are two buildings: a factory 605 with SCADA system components 609 and 610 and a three story hotel building 604 with fire alarm system components 606 and 607.

Signal Location Using Fire Alarm Systems

Inside the hotel building 604 there is a fire alarm system with a main electronic processor unit 606 (main fire alarm panel), a graphic display unit 607 (annunciation panel), and four special 911 signal monitoring devices 608 and 611. Devices 608 (three shown FIG. 6) are indoor devices connected to a fire alarm system and device 611 is an outdoor device connected to a fire alarm system. The special 911 signal monitoring devices 608 and 611 are connected to the main electronic processor 606 by means of a cable network. The graphic display unit 607 (annunciation panel) may be located at the main entrance of a public building for viewing by the firefighters upon arriving at the scene of a fire. The graphic display provides a map-like view of the complete building and indicates the location of the detector that has sensed an alarm condition. The detector may be a smoke or heat detector. For simplicity smoke and heat detectors are not shown in FIG. 6 but are assumed to be present. The special 911 signal monitoring devices 608 are connected to the fire alarm system for the purpose of detecting nearby emergency cell phone calls to a 911 call center. These special 911 signal monitoring devices 608 detect either RF and/or acoustic (ultrasonic) signals from nearby user cell phone devices and provide an appropriate alarm condition that is displayed on graphic display unit 607 and automatically forwarded through the same or similar network that is used for off-site fire alarm reporting.

An outdoor special 911 signal monitoring device 611 may also be installed outside the hotel but connected to the fire alarm system network. The purpose of this device 611 is to provide location of 911 calls near the building along the nearby sidewalks and streets. Cell phone user 601 is located on the second floor of the hotel and is placing an emergency call to an off-site 911 call center. The call is sent to cell tower 614 via the RF signal 616. In addition, special RF and/or acoustic signals 619 are also emitted from the cell phone and are detected by a nearby special 911 signal monitoring device (e.g., in device 608). Cell phone user 602 is located on a sidewalk outside the hotel and is also placing an emergency call to a 911 call center. The call is sent to cell tower 615 via the RF signal 617. In addition, special RF and/or acoustic signals 620 are emitted from the cell phone and are detected by nearby outdoor special 911 signal monitoring devices 611. Note that since the special 911 signal monitoring devices 608 and 611 may have limited range (e.g., as compared to a cell tower), it is possible to accurately (or more accurately) locate a caller to a specific room within the hotel or within a limited distance outside of the building.

Signal Location Using Other Building Systems

In addition to the preceding description of the special 911 signal monitoring devices 608 and 611 being connected to a fire alarm system, in one embodiment the special 911 signal monitoring devices 608 and 611 may be connected and interfaced with a card access systems, code access systems, intrusion alarm systems, surveillance systems, computer networks and other similar facility systems found in public and private buildings.

Signal Location Using SCADA Systems

FIG. 6 also includes a factory 605 with SCADA system components. Inside the factory 605 there is a SCADA system with a main electronic processor unit 609 (e.g., a desktop computer), a remote device controller unit 610 (e.g., a programmable logic controller PLC unit) and two special 911 signal monitoring devices 612 and 613. The special 911 signal monitoring devices 612 and 613 are connected to the remote device controller unit 610 by means of a cable network. The remote device controller unit 610 (e.g., a programmable logic controller PLC unit) is an example of several such units that may be located throughout the factory in close proximity to the equipment they operate and monitor such as motors, valves, louvers and heaters.

The main electronic processor unit 609 (e.g., a desktop computer) provides a graphic display of the factory equipment and the process flow within the factory. The main electronic processor unit 609 may also provide a map-like view of the complete factory and indicate the location of motors, valves, louvers and heaters and also the special 911 signal monitoring devices 612 and 613 and their alarm status. For simplicity the factory motors, valves, louvers and heaters are not shown in FIG. 6 but are assumed to be present. The special 911 signal monitoring devices 612 and 613 are connected to the SCADA system for the purpose of detecting nearby emergency cell phone calls to a 911 call center. These special 911 signal monitoring devices 612 and 613 detect either RF and/or acoustic (ultrasonic) signals from nearby user cell phone devices and provide an appropriate alarm condition that is automatically forwarded through the same or similar network that is used for the SCADA system off-site reporting.

An outdoor special 911 signal monitoring device 613 may be installed outside the factory but connected to the SCADA system network. The purpose of this device 613 is to provide location of 911 calls near the building along the nearby storage yards, sidewalks and streets. Cell phone user 603 is located inside the factory and is placing an emergency call to an off-site 911 call center. The call is sent to cell tower 615 via the RF signal 618. In addition, special RF and/or acoustic signals 621 are also emitted from the cell phone and are detected by nearby special 911 signal monitoring devices 612. A cell phone user that is located outside the factory may also make an emergency call to a 911 call center. The call may be sent to cell tower 615. In addition, special RF and/or acoustic signals that are emitted from the cell phone may be detected by a nearby outdoor special 911 signal monitoring device 613 located outside the factory. Note that since the special 911 signal monitoring devices 612 and 613 have limited range (e.g., as compared to a cell tower), it is possible to accurately (or more accurately) locate a caller to a specific area within the factory or within a limited distance outside of the factory.

Signal Location Using Other Industrial Systems

In addition to the preceding description of the special 911 signal monitoring devices 612 and 613 being connected to a factory SCADA system, in one embodiment the special 911 signal monitoring devices 612 and 613 may be connected and interfaced with a card access systems, code access systems, intrusion alarm systems, surveillance systems and other similar facility systems found in factories, manufacturing and other commercial facilities.

Part 3: Monitoring Devices in Fire Alarm System and SCADA System

Signal Monitoring Devices

One embodiment may provide an apparatus that can identify the location (e.g., more exact location) of a cell phone when making an emergency call in any building, factory and other structures that are located in any size metropolis whether or not the metropolis exhibits a strong signal multipath environment.

Host Fire Alarm Systems

One embodiment may use or is a cell phone distress call signal monitoring device. This embodiment may comprise a compact cell phone distress call signal monitoring device with a physical configuration and form factor similar to an addressable smoke detector used within an addressable fire alarm system.

Figure 7:
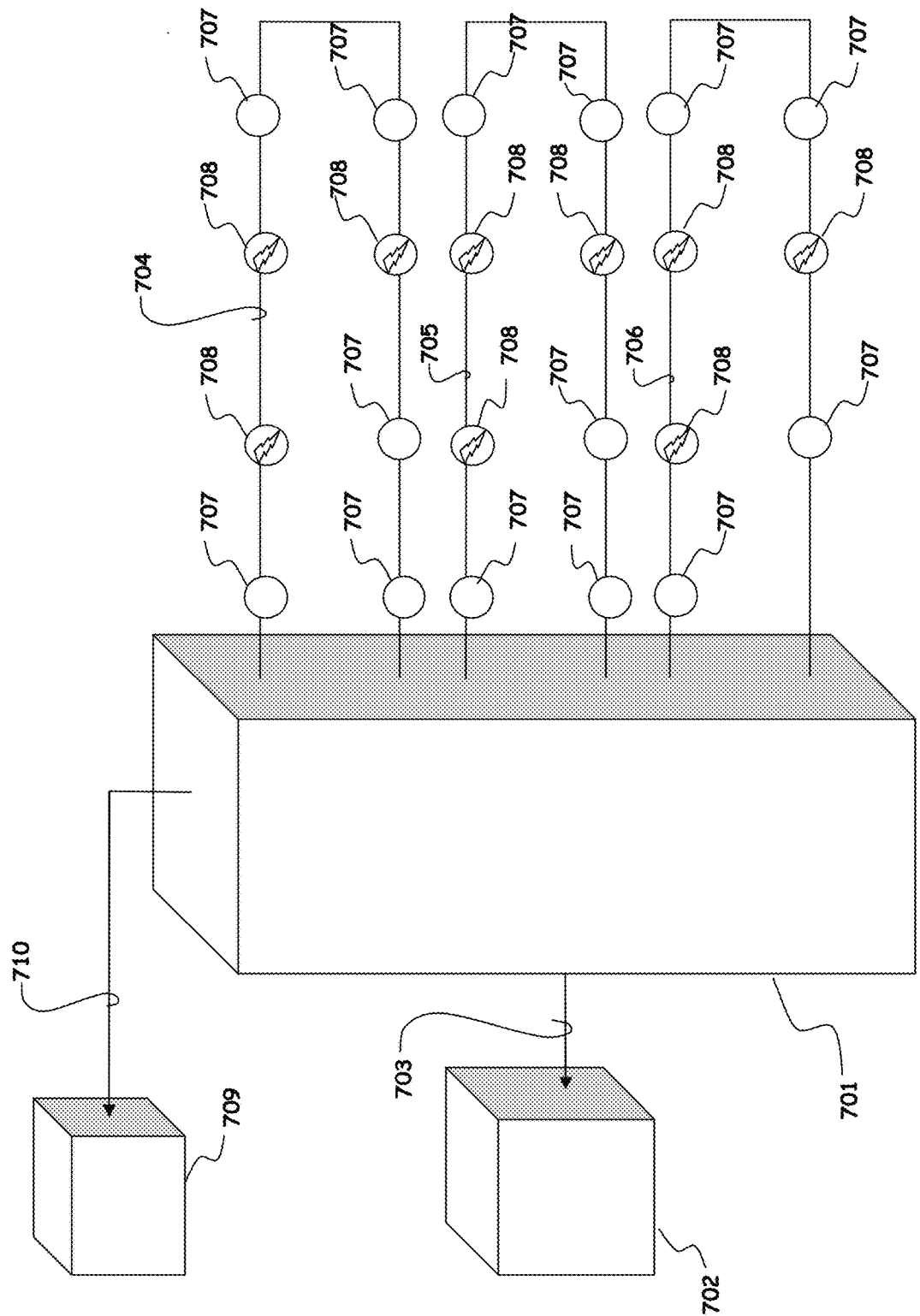
FIG. 7 illustrates a Fire Alarm System.

FIG. 7 illustrates the configuration of an addressable fire alarm system with the special 911 signal monitoring devices included. This drawing illustrates a block diagram of an addressable fire alarm system. The fire alarm control panel 701 is the main electronic processor unit of the system. The fire alarm annunciation panel 702 is a graphic display unit that displays a visual map of a building or facility and thereby indicates the location (e.g., exact location) of an alarm condition. The fire alarm annunciation panel 702 may be located at the main entrance of a building or facility in plain view of firefighters and other emergency personnel.

FIG. 7 illustrates three circuit loops 704, 705 and 706 connected to the fire alarm control panel. Each of these circuit loops may have many fire detection devices, such as device 707, connected to the wiring. Devices 707 (fourteen illustrated in FIG. 7, but more or fewer possible) are fire detection devices connected to the illustrated fire alarm system. The connected fire detection devices 707 illustrated in FIG. 7 may be smoke detectors, heat detectors and infra-red flame detectors. Many other types of fire warning devices not illustrated such as strobes and horns may also be connected within a fire alarm system. In one embodiment, the three circuit loops 704, 705 and 706 may also have connected one or more special 911 signal monitoring devices, such as device 708. Devices 708 (nine illustrated in FIG. 7, but more or fewer possible) are 911 signal monitoring devices connected to the illustrated fire alarm system. Since this is an addressable fire alarm system, each device 707 and 708 on circuit loops 704, 705 and 706 may emit an address signal (e.g., a unique address signal) to the fire alarm control panel 701 periodically indicating its status. If an alarm condition arises at one or more devices 707 and 708, those particular devices may send an alarm condition and their respective addresses over their respective circuit loops to the fire alarm control panel 701. The address of each particular device is documented during installation along with the device location (room number, floor number, etc.). In addition the fire alarm annunciation panel graphic display 702 may be configured to visually indicate an alarm location that corresponds with the address and location of any device that goes into an alarm condition.

Fire Alarm System Reporting

The fire alarm control panel 701 may also be connected to an off-site fire station or other emergency facility 709 via connection 710. Connection 710 may be a telephone line, a wireless connection or an Ethernet connection. The fire alarm control panel 701 may automatically communicate any fire or special 911 signal monitoring alarm conditions, including the location (e.g., exact or more exact location) of any special 911 signal monitoring devices 708 that are in alarm, to the emergency facility 709. The fire alarm control panel 701 may also provide a visual indication of the alarm conditions at the fire alarm annunciation panel 702.

SCADA and Other Host Systems

Figure 8:
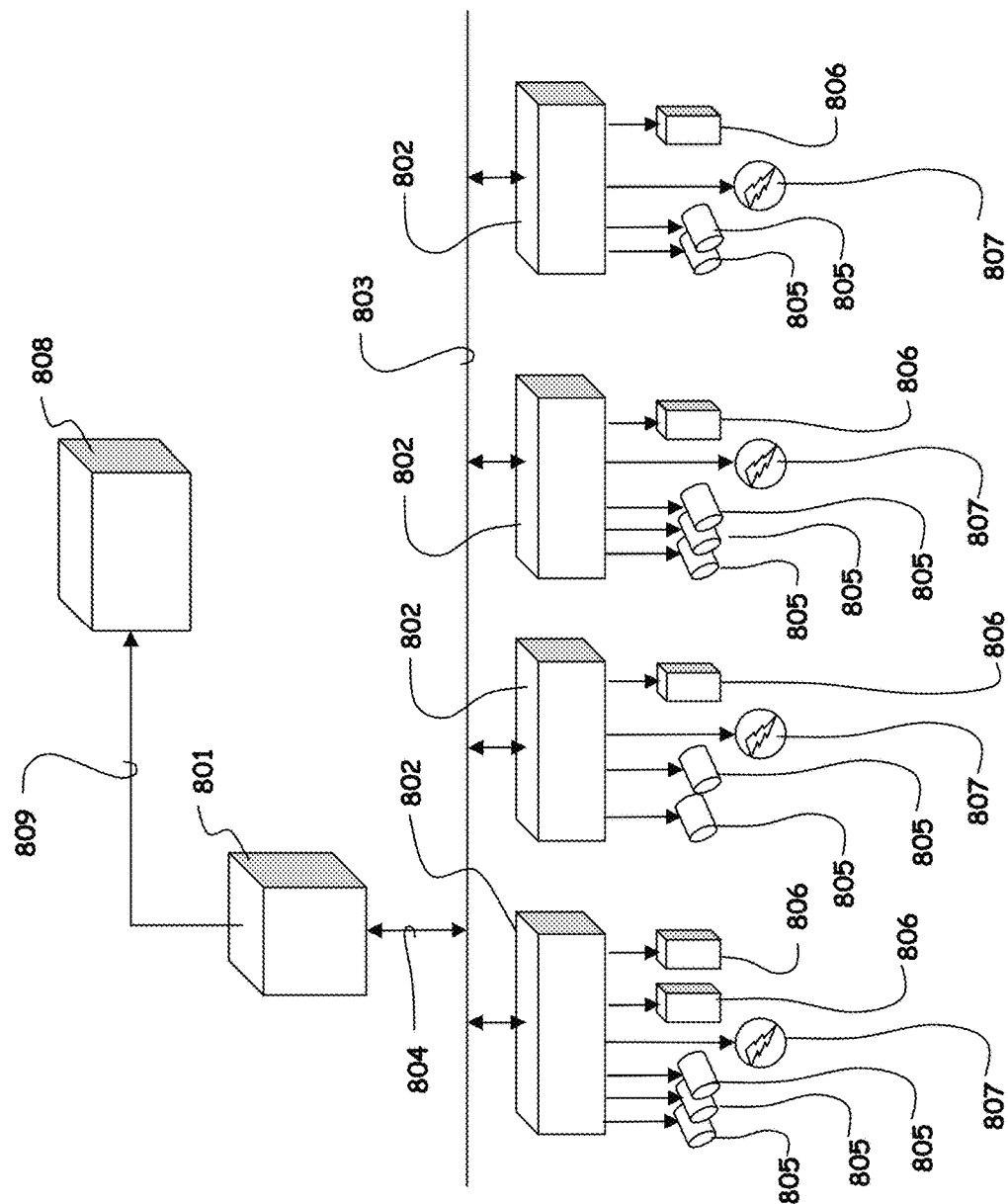
FIG. 8 illustrates a SCADA System.

In addition the addressable signal monitoring device may also be designed for use with other types of systems such as intrusion alarm systems, card or code access security systems, computer networks and building System Control and Data Acquisition (SCADA) systems. SCADA systems may be used to regulate and monitor the operation of building air conditioning equipment, manufacturing machinery, municipal water processing machinery, lighting circuits, elevators, ventilation fans, intrusion detection devices and fire detection devices. FIG. 8 illustrates this configuration.

FIG. 8 illustrates a block diagram of a SCADA system. The main electronic processor unit 801 (e.g., a desktop computer) is the primary man-machine interface and control point for the entire SCADA system. Remotely located device controller units 802 may be programmable logic controller PLC units that are interfaced with the main electronic processor by means of a cable or bus network 803 and 804. One or more remote device controller units 802 (four illustrated in FIG. 8, but more or fewer possible) may be located throughout the factory and in close proximity to the equipment they operate such as motors, valves, chemical analyzers, louvers and heaters. FIG. 8 illustrates motorized equipment 805 and chemical analyzers 806 connected to the device controller units 802.

Each device controller 802 may control up to ten or more pieces of equipment. In one embodiment, the device controller units 802 may also have connected one or more special 911 signal monitoring devices, such as device 807. Devices 807 (four illustrated in FIG. 8, but more or fewer possible) are 911 signal monitoring devices connected to the SCADA system. The special 911 signal monitoring devices 807 are connected to the SCADA system for the purpose of detecting nearby emergency cell phone calls being made to an off-site 911 call center. These special 911 signal monitoring devices 807 detect either RF and/or acoustic (ultrasonic) signals from nearby user cell phone devices and provide an appropriate alarm condition to the main electronic processor unit 801. The main electronic processor unit 801 provides a graphic display of the factory equipment and the process flow within the factory and may also provide a map like view of the complete factory and indicates the location of motors, valves, louvers and heaters and also the special 911 signal monitoring devices 807 and their alarm status.

SCADA System Reporting

The main electronic processor unit 801 is interfaced with an off-site monitoring and emergency response facility 808 via connection 809. This connection 809 may be a telephone line, a wireless connection or an Ethernet connection. The SCADA system may automatically communicate any special 911 signal monitoring alarm conditions, including the location (e.g., exact or more exact location) of any special 911 signal monitoring devices 807 that are in alarm, to the off-site monitoring and emergency response facility 808.

Part 4: RF and Acoustic Monitoring Device Circuits and Operation

Signal Monitoring Device Design Configuration

Each special 911 signal monitoring device illustrated in FIG. 6, FIG. 7 and FIG. 8 may be designed and constructed to monitor and detect radio frequency (RF) and/or acoustic signals that may emanate from a cell phone that may be configured to emit such signals when the cell phone user is making a distress call. The specific choice of acoustic or RF signals to be used and the frequencies of those signals and their encoding may be determined by the Federal Communications Commission (FCC) regulations and industry standards.

A signal monitoring device may include circuits for monitoring and receiving acoustic signals and/or RF signals. The signal monitoring device may be equipped with circuits that could appropriately decode the acoustic and/or RF signals to determine if an emergency call is being made and to determine the identity of the cell phone being used. The signal monitoring device may also be equipped with circuits that could appropriately detect the acoustic and/or RF signals to determine the signal strength of the RF and acoustic signals and forward some or all information to the main electronic processor of the fire alarm system, SCADA system or any other system to which the signal monitoring device is connected.

RF Monitoring Device

The circuits comprising each RF signal monitoring device may include: antenna, RF amplifier, receiver circuit, detector circuit, decoder circuit, automatic gain control (AGC) circuit, power supply circuit, data encoder circuit and/or data terminals.

Figure 9:
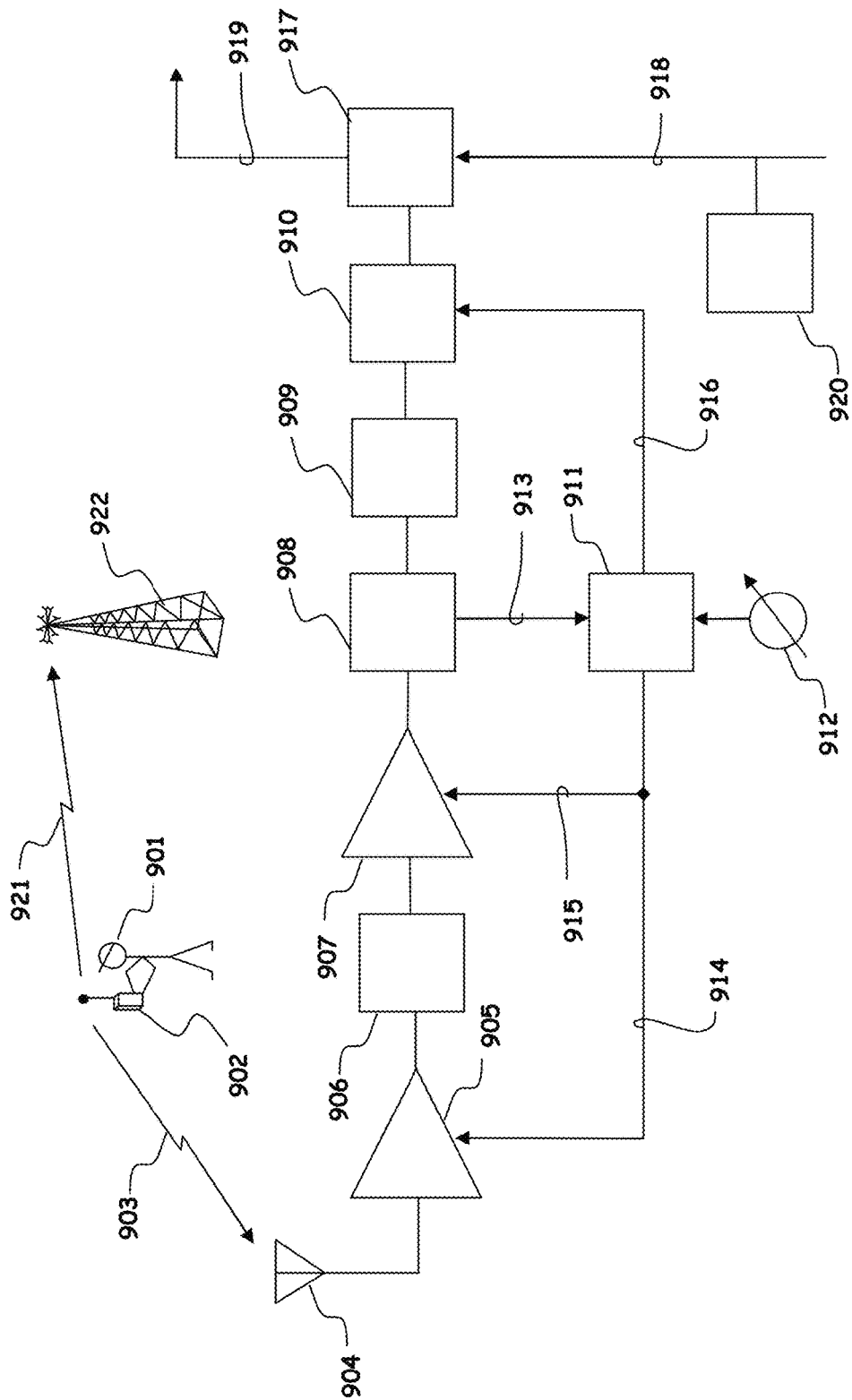
FIG. 9 illustrates an RF Signal Monitoring Device.

FIG. 9 illustrates a circuit block diagram for an RF signal monitoring device. A cell phone user 901 is illustrated holding a cell phone 902. The cell phone user 901 is making an emergency phone call and cell phone 902 is radiating an RF signal 921 to a local cell tower 922. In addition, the cell phone 902 is radiating an RF signal 903 to antenna 904 that is part of the RF signal monitoring device. The RF signal monitoring device is comprised of antenna 904, signal preamplifier 905, signal filter 906, receiver circuit 907, signal detector 908, signal decoder 909, data encoder 910, AGC amplifier 911, detection sensitivity control 912, AGC connection from detector 913, AGC connection to preamplifier 914, AGC connection to receiver circuit 915, AGC connection to data encoder 916, data modem 917, host system network cable input 918, host system network cable output 919, and/or power supply 920. Antenna 904 may have a directional pattern for receiving signals in a manner that gives preference to signals from desired directions or that rejects signals from specific directions. In addition, RF absorbing and/or shielding materials may be installed adjacent to an RF signal monitoring device to control received signal directional patterns. These features are intended to improve system performance (in at least one embodiment) in terms of preventing signals from passing through floors and ceilings to and from a cell phone and thus causing a cell phone location error. These antenna directional features may be omitted in other embodiments.

NOTE: The noun phrase, "electronic device units for detection of emergency call," may also be referred to as special signal monitoring devices, signal monitoring devices, monitoring devices or as monitoring circuits, special signal detectors or simply as detectors.

RF Device Operation

Antenna 904 receives the RF signal 903 from the cell phone 902. Antenna 904 is connected to signal preamplifier 905 and sends the signal to the preamplifier for amplification. Signal preamplifier 905 is connected to signal filter 906 and sends the signal through signal filter 906 to the input of the receiver circuit 907. The receiver circuit 907 may down convert the signal to a lower IF frequency and may filter and may further amplify the signal. The receiver circuit 907 output is connected to the signal detector 908. The signal is sent to signal detector 908 that separates the data components and the signal magnitude component from the IF carrier signal that is output from the receiver circuit 907. The signal detector 908 may additionally contain a clock and may contain a signal correlator that together they operate on the received signal to establish an absolute or relative time-of-arrival for the signal 903. The time-of-arrival information may be stored for subsequent use.

The data components from signal detector 908 are sent to signal decoder 909 which may inspect the data for information that is deemed relevant for the functionality of the RF signal monitoring device. The signal decoder 909 may further send information to the data encoder 910 for further transmission via the data modem 917 to the host system via the host system network cable output 919. The signal magnitude component 913 from signal detector 908 is sent to the AGC amplifier 911. The detection sensitivity control 912 is also connected to the AGC amplifier 911 and establishes the distance or range sensitivity calibration for the RF signal monitoring device. The signal magnitude component from signal detector 908 is amplified by the AGC amplifier 911 and sent to the signal preamplifier 905 (via AGC connection 914) and to the receiver circuit 907 (via AGC connection 915) to provide negative gain feedback to ensure the linearity of the receiver amplification chain. The AGC amplifier 911 may also send information to the data encoder 910 for further transmission of signal magnitude data via the data modem 917 to the host system via the host system network cable output 919. The data modem 917 is connected to the host system network via the host system network cable input 918 that comes from the host system and the host system network cable output 919 that returns to the host system. The RF signal monitoring device derives its operating power from the power supply 920. The power supply 920 may derive its source of power from the host system network cable input 918.

The modem 917 may alternatively be connected to other host systems such as SCADA systems, internet access systems or other building monitoring systems in which case the modem 917 may have other connection means with the host system that include wireless, fiber optic cable or other wired means.

Acoustic Monitoring Device

The circuits comprising each acoustic signal monitoring device may include: microphone, audio pre-amplifier, filter circuits, amplifier circuits, detector circuit, decoder circuit, automatic gain control (AGC) circuit, power supply circuit, data encoder circuit, and/or data terminals. The acoustic signal, if used, may include an ultrasonic signal above the range for human hearing. Ultrasonic signals may be used for privacy and to prevent other persons present from knowing, audibly, that a distress call is being made.

Figure 10A:
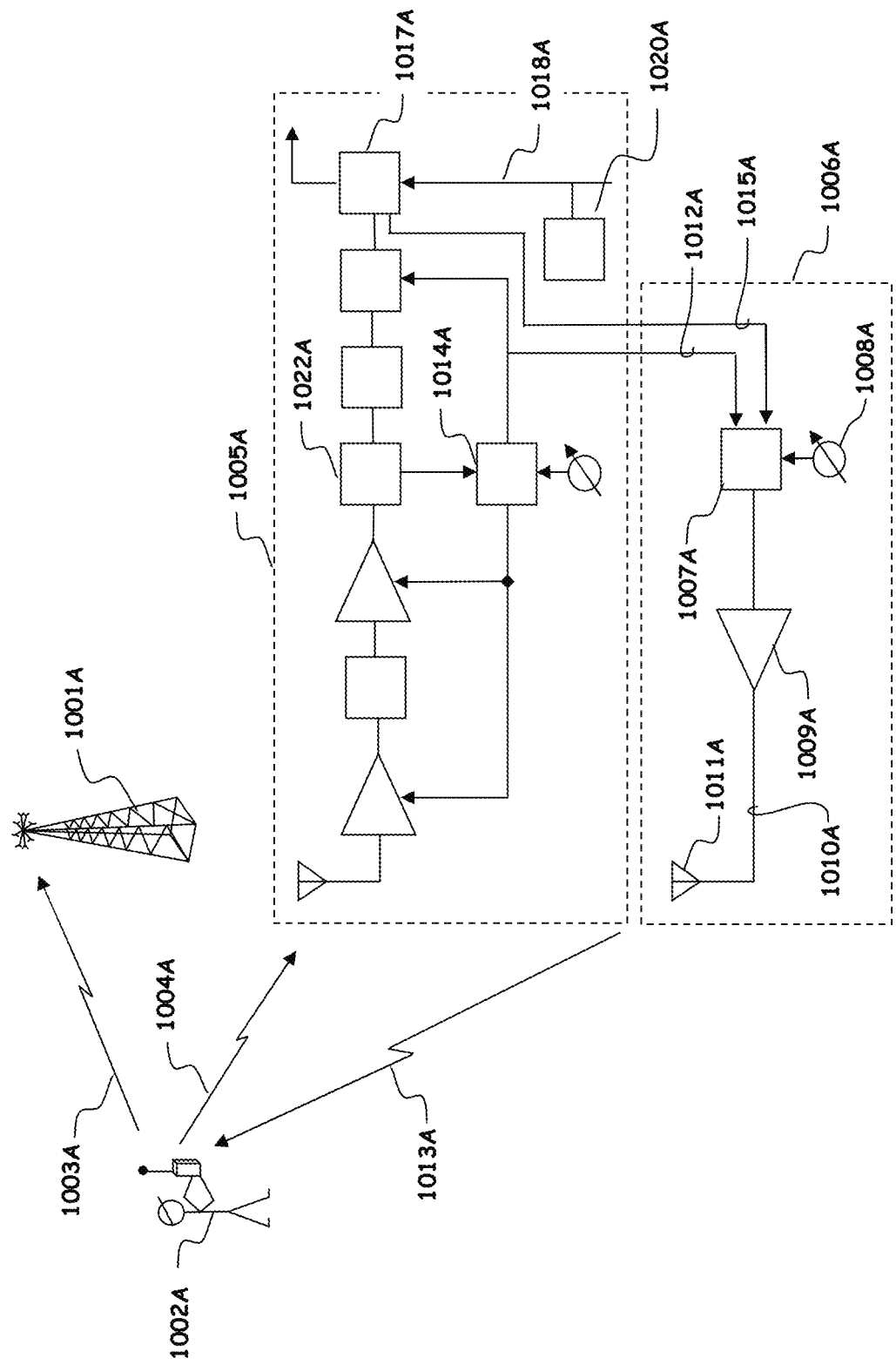
FIG. 10A illustrates an Acoustic Signal Monitoring Device with Forward Link Signal.
Figure 10B:
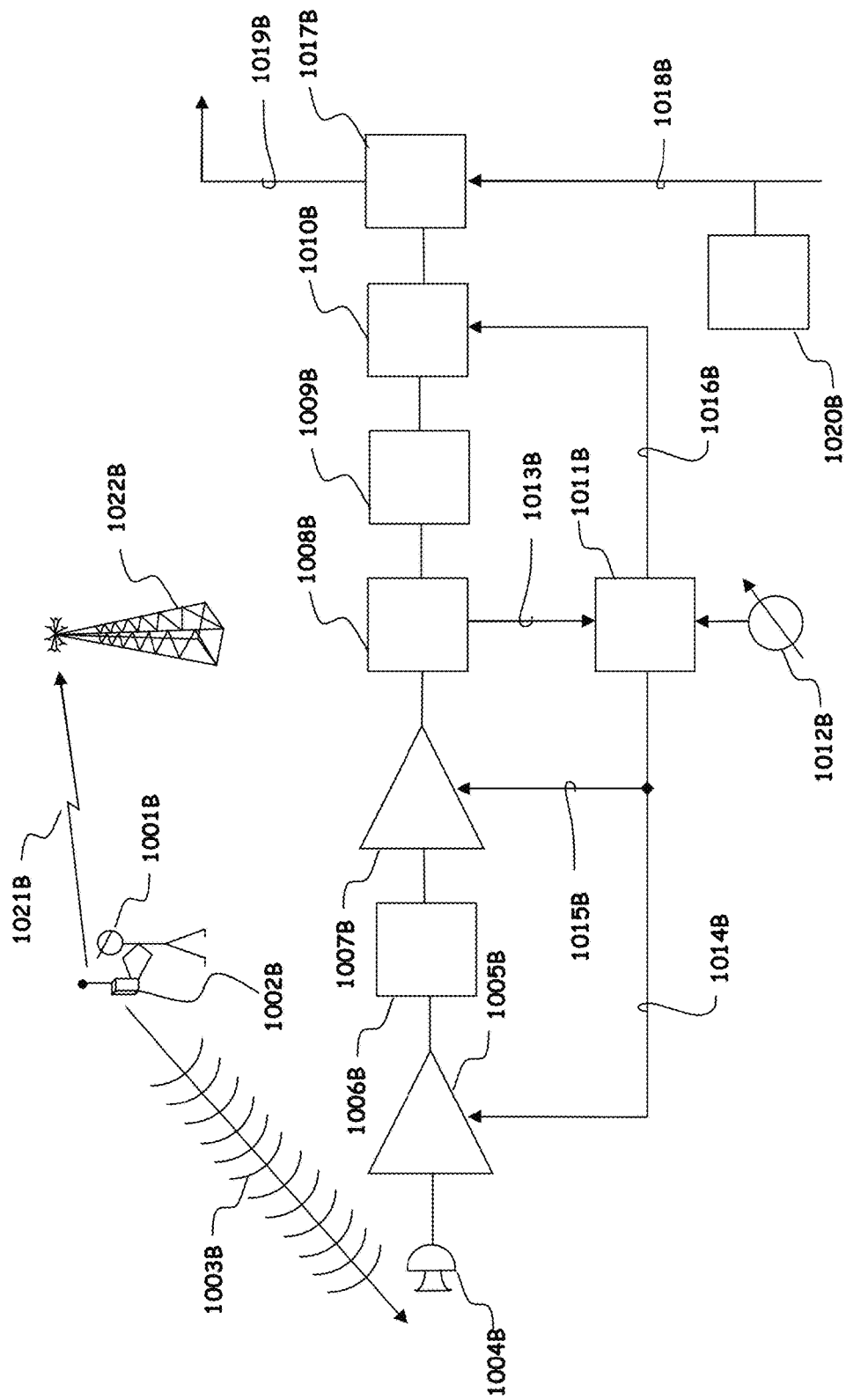
FIG. 10B illustrates an Acoustic Signal Monitoring Device.

FIG. 10B illustrates a circuit block diagram for an acoustic signal monitoring device. A cell phone user 1001B is illustrated holding a cell phone 1002B. The cell phone user 1001B is making an emergency phone call and cell phone 1002B is radiating an RF signal 1021B to a local cell tower 1022B. In addition, the cell phone 1002B is radiating an acoustic signal 1003B to microphone 1004B that is part of the acoustic signal monitoring device. The acoustic signal monitoring device is comprised of microphone 1004B, signal preamplifier 1005B, signal filter 1006B, second amplifier circuit 1007B, signal detector 1008B, signal decoder 1009B, data encoder 1010B, AGC amplifier 1011B, detection sensitivity control 1012B, AGC connection from detector 1013B, AGC connection to preamplifier 1014B, AGC connection to second amplifier circuit 1015B, AGC connection 1016B to data encoder 1010B, data modem 1017B, host system network cable input 1018B, host system network cable output 1019B and power supply 1020B.

Acoustic Device Operation

Microphone 1004B receives the acoustic signal 1003B from the cell phone 1002B. Microphone 1004B is connected to signal preamplifier 1005B and sends the signal to the preamplifier for amplification. Signal preamplifier 1005B is connected to signal filter 1006B and sends the signal through signal filter 1006B to the input of the second amplifier circuit 1007B. The second amplifier circuit 1007B may further amplify and filter the signal. The second amplifier circuit 1007B output is connected to the signal detector 1008B. The signal is sent to signal detector 1008B that separates the data components and the signal magnitude component from the signal that is output from the second amplifier circuit 1007B.

The signal detector 1008B may additionally contain a clock and may contain a signal correlator that together operate on the received signal to establish an absolute or relative time-of-arrival for the signal 1003B. The time-of-arrival information may be stored for subsequent use.

The data components from signal detector 1008B are sent to signal decoder 1009B which may inspect the data for information that is deemed relevant for the functionality of the acoustic signal monitoring device. The signal decoder 1009B may further send information to the data encoder 1010B for further transmission via the data modem 1017B to the host system via the host system network cable output 1019B.

The signal magnitude component 1013B from signal detector 1008B is sent to the AGC amplifier 1011B. The detection sensitivity control 1012B is also connected to the AGC amplifier 1011B and establishes the distance or range sensitivity calibration for the acoustic signal monitoring device. The signal magnitude component 1013B from signal detector 1008B is amplified by the AGC amplifier 1011B and sent to the signal preamplifier 1005B (via AGC connection 1014B) and to the second amplifier circuit 1007B (via AGC connection 1015B) to provide negative gain feedback to ensure the linearity of the receiver amplification chain. The AGC amplifier 1011B also sends information 1016B to the data encoder 1010B for further transmission of signal magnitude data via the data modem 1017B to the host system via the host system network cable output 1019B. The data modem 1017B is connected to the host system network via the host system network cable input 1018B that comes from the host system and the host system network cable output 1019B that returns to the host system. The acoustic signal monitoring device derives its operating power from the power supply 1020B. The power supply 1020B may derive its source of power from the host system network cable input 1018B.

The modem 1017B may alternatively be connected to other host systems such as SCADA systems, internet access systems or other building monitoring systems in which case the modem 1017B may have other connection means with the host system that include wireless, fiber optic cable or other wired means.

Part 5: Monitoring Device with Forward Link:
Device Summary and Device Form Factor Forward Signal Link to Wireless Device The circuits comprising each RF or acoustic signal monitoring device illustrated at FIGS. 9 and 10B may include an additional circuit that upon detecting an emergency call being made, subsequently emits an RF and/or acoustic forward link signal to the user's wireless communications device. That forward link signal may contain specific location information that designates the location (e.g., exact location) of the signal monitoring device. This location information may include the device serial number, the building address, floor and room number and/or the geo-location of the signal monitoring device. Part or the entire forward link signal may be conveyed to the Wireless Device over Wifi and/or the internet; wherein the monitoring device data is interfaced with the Wifi network at the host system controller and/or host system processor. The user's wireless communication device may then automatically forward the location data to a 911 call center. FIG. 10A illustrated a cell phone user 1002A placing an emergency call and a nearby signal monitoring device 1005A with additional forward link signal transmitter 1006A. The signal monitoring device serial number would, in one embodiment, be unique for each signal monitoring device. The serial number may be assigned when the device is manufactured and/or installed. In 911 call center systems that are equipped to utilize device serial numbers, the 911 call center would, in one embodiment, maintain a database that identifies the installed location of each serial numbered signal monitoring device. This database would be compiled from installation data provided by equipment installer/technicians. The 911 call center would access the database to determine the location of the emergency cell phone call.

Hereafter in the many descriptions of cell phones, wireless communications devices, handheld radios and medical devices, it is understood that the special signal monitoring devices are equipped with both monitoring circuits, i.e. receiving circuits, and forward link circuits, i.e. transmitting circuits.

FIG. 10A illustrates a circuit block diagram for a signal monitoring device with an additional forward link transmitter. The circuits comprising the forward link transmitting circuit 1006A may include: device location data memory 1007A, location data input device 1008A, RF and/or acoustic signal modulator 1009A, signal radiating element 1011A for sending RF and/or acoustic signals, interconnecting feed line 1010A from signal modulator 1009A to the signal radiating element 1011A and an interconnection 1012A between the signal monitoring circuit 1005A and the forward link signal transmitter 1006A. The signal radiating element 1011A may be shared with signal monitoring circuit 1005A and thereby provide the signal monitoring device and forward link circuits with a common element for both sending and receiving signals. The circuits may additionally include an AGC data interconnection 1012A between the signal monitoring circuit 1005A and the location memory 1007A. Time-of-arrival data may also be sent from the signal detector 1022A to the location memory 1007A via interconnection 1012A.

An interconnection 1015A may additionally be implemented between modem 1017A and location data memory 1007A for sending data from the host system via the host system network cable input 1018A and modem 1017A.

The location data input device 1008A represents the apparatus/means by which an equipment installer/technician enters the location information into the device location data memory 1007A. The location data input device 1008A may, in one embodiment, include an external logic device such as a portable computer that interfaces with the device location data memory 1007A via a wire or wireless portal. Other means of data entry may be used. The means of data entry may include entering the signal monitoring device location e.g. the building address, floor number, room number and/or geo-coordinates. One alternative means of data entry may include assigning a serial number (e.g., a unique serial number) to each signal monitoring device 1005A with forward link signal transmitter 1006A. That serial number may be assigned and entered at the manufacturing facility and/or upon device installation. In systems that utilize device serial numbers, the 911 call center would, in one embodiment, maintain a database that identifies the installation location of each serial numbered device. The database would, in one embodiment, be compiled from installation location data provided by equipment installers/technicians.

A cell phone user 1002A is illustrated holding a cell phone. The cell phone user 1002A is making an emergency phone call and the cell phone is radiating an RF signal 1003A to a local cell tower 1001A. In addition, the cell phone is radiating a special signal (via RF and/or acoustic signals) 1004A to the signal monitoring device 1005A. When the signal monitoring device 1005A detects a nearby emergency call being made, it may activate the forward link signal circuit 1006A via connection 1012A. The location memory data residing in the device location data memory 1007A may subsequently be conveyed to the signal modulator 1009A. The signal modulator 1009A may transmit the location information via the forward signal link 1013A (via RF and/or acoustic signals) to the cell phone. The cell phone may then automatically forward the location data to the 911 call center via signal 1003A and the tower 1001A.

The location data memory 1007A may also receive AGC data from AGC amplifier 1014A and time-of-arrival data from signal detector 1022A via interconnection 1012A. The AGC data and time-of-arrival data may subsequently be conveyed to the signal modulator 1009A for transmission via the forward link signal 1013A to the cell phone at 1002A. The cell phone may further use the AGC data and time-of-arrival data to estimate the distance, or estimate a relative distance, between the cell phone user 1002A and the signal monitoring circuit 1005A. The cell phone may compare the AGC data and/or the time-of-arrival data for data received from one or more signal monitoring devices and select the signal monitoring device that is closest to the cell phone user. The cell phone may alternatively or additionally process the AGC data and/or the time-of-arrival data from one or more signal monitoring devices to estimate the location of the cell phone with respect to one or more of the signal monitoring devices and/or estimate the location of the cell phone within the facility. This location information may be stored in the memory of the cell phone.

Additional data from the host system network cable input 1018A to the modem 1017A may be subsequently sent to the location data memory 1007A via interconnection 1015A. The additional data may subsequently be conveyed to the signal modulator 1009A for transmission via the forward link signal 1013A to the cell phone at 1002A.

When the signal monitoring device 1005A with modem 1017A is hosted by a traditional wire interconnected addressable fire alarm system, the data rates between the signal monitoring device 1005A and the host system network may be relatively slow compared with an internet access system. On the other hand, data exchange rates may be relatively high when the modem 1017A is connected to a high data rate host system such as an internet access system or a facility computer system wherein the host system network includes wireless, fiber optic cable or other high speed wired means.

The cell phone features for sending and receiving the special signals 1004A and 1013A to and from a cell phone may (and/or must) be available on cell phones and wireless devices during (e.g., all cell phones and/or wireless devices) emergency 911 calls. This requirement may be necessary for a location system to be fully effective; on less than all cell phones the system may still be effective, however.

Signal Monitoring Device Summary

Figure 11:
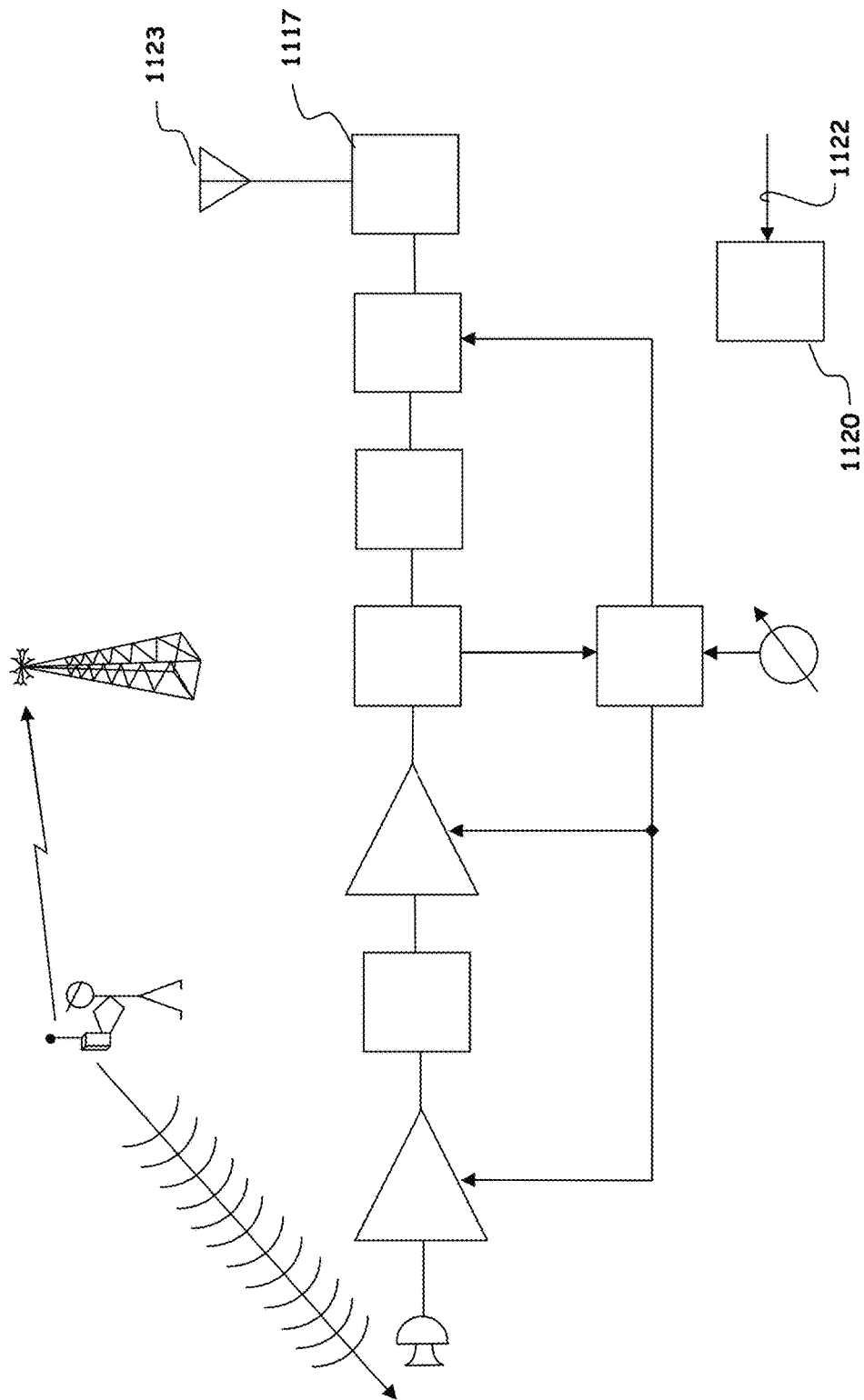
FIG. 11 illustrates an Acoustic Signal Monitoring Device with wireless modem.

Each special 911 signal monitoring device illustrated in FIG. 9, FIG. 10A and FIG. 10B may be designed and constructed to connect to the local fire alarm or other host system network via the data modems 917, 1017A and 1017B respectively. They may also derive their power from the host system data network via connected power supplies 920, 1020A and 1020B. FIG. 11, however, illustrates an alternate special 911 signal monitoring device with a wireless data modem 1117 and antenna 1123 for communication with the host system via a wireless interface. The special 911 signal monitoring device illustrated in FIG. 11 may energize its power supply 1120 via a connection 1122 that is connected to a local utility or other power source.

Signal Monitoring Device Form Factor

Special 911 signal monitoring devices may be either single purpose devices or may be combined and share an enclosure with another monitoring device. For example the signal monitoring device may be combined with a smoke detector device.

Figure 12:
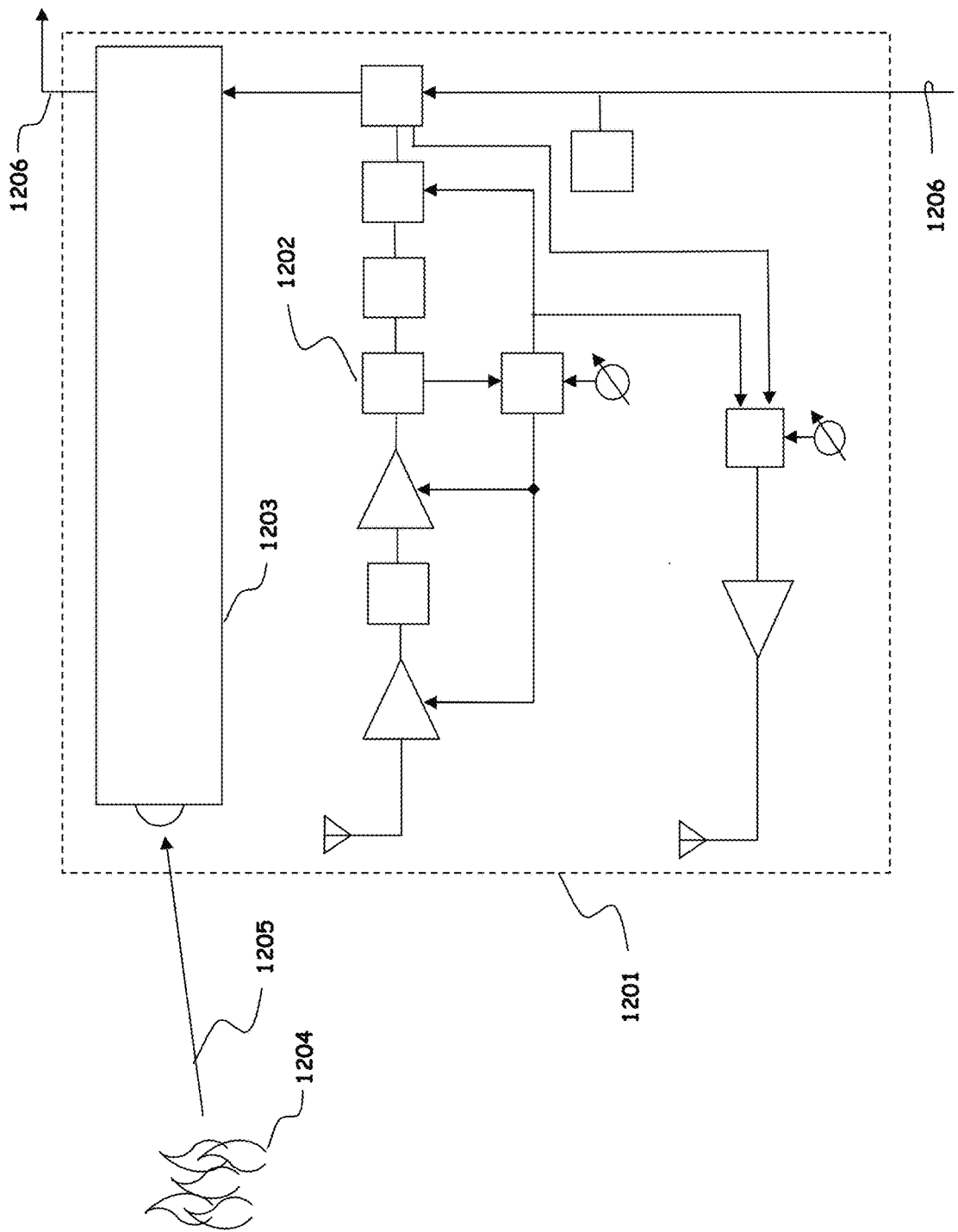
FIG. 12 illustrates an Acoustic Signal Monitoring Device with fire detector.

One embodiment provides a special 911 signal monitoring device that is combined with and shares an enclosure with a fire or other monitoring device. FIG. 12 illustrates an example of an RF special 911 signal monitoring device 1202 combined with an infrared fire detection device 1203 into a single enclosure 1201 and connected to a fire alarm system via network cable 1206. The special 911 signal monitoring device 1202 may detect emergency cell phone calls while the infrared fire detection device 1203 may detect infrared radiation 1205 from a local fire 1204.

Part 6: Cell Phones with RF Special Signal Circuits

Cell Phones with Special Signals Design Considerations

Each cell phone illustrated in FIGS. 6, 9, 10A and 10B is equipped to send a special RF and/or acoustic signal when making an emergency or distress call. The special RF and/or acoustic signal is intended for reception by a local special signal detector that may be autonomous or connected to a building fire alarm system, security system, computer network system, telephone system, card access system, SCADA system or any other building system. The special signal detector may or may not include circuits that emit forward link location data to a cell phone.

Cell Phones Circuit for RF Special Signals

The special signal circuits comprising a cell phone with RF special signaling may include: RF signal source, data memory for storing the identification data associated with the cell phone, data memory for storing the emergency call identifier data, data encoder for modulating the RF signal with the identification and emergency call data, control circuits, RF amplifier and antenna.

Figure 14:
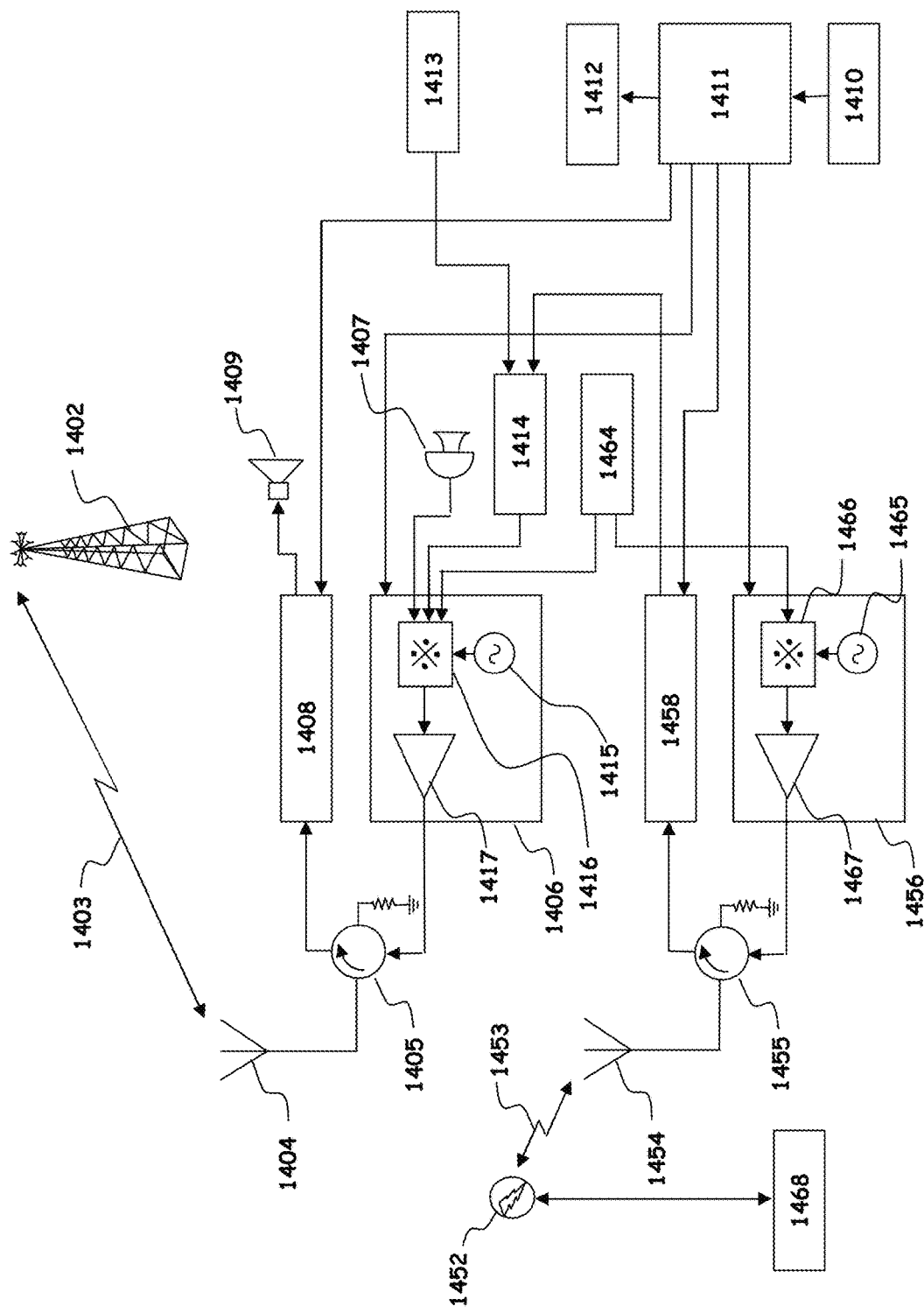
FIG. 14 illustrates a Cell Phone with Special RF Signaling.

FIG. 14 illustrates a circuit block diagram for a cell phone with traditional circuits and with RF special signaling circuits. The circuits comprising each cell phone may include: Antennas 1404 and 1454, antenna couplers 1405 and 1455, receiver circuits 1408 and 1458, speaker 1409, microphone 1407, transmitter circuits 1406 and 1456, signal sources 1415 and 1465, data modulators 1416 and 1466, RF amplifiers 1417 and 1467, GPS receiver 1413, location data memory 1414, cell phone identification data memory 1464, keypad 1410, control logic circuits 1411 and visual display 1412.

The cell phone with RF special signaling circuit may operate in the following manner when making a routine, non-emergency call. The user initiates a call by keystrokes, or voice commands via the keypad 1410 or microphone 1407. The keypad 1410 and microphone 1407 are connected to the control logic circuits 1411 which circuits are connected to visual display 1412, cell phone receiver 1408 and cell phone transmitter 1406. The control logic initiates a cell phone call by activating the receiver 1408, transmitter 1406 and by initiating and controlling data which is sent to the transmitter. This data may include but not be limited to the identification of the cell phone as contained in the identification data memory 1464, the dialed phone number and the digitized voice signal of the user. The transmitter 1406 includes an RF signal source 1415 which establishes the RF carrier frequency. The data modulator 1416 modulates the RF signal with the digitized data from the cell phone identification memory, the number called and the digitized voice of the caller. Amplifier 1417 increases the power level of the RF signal to a magnitude sufficient to communicate with a nearby cell tower 1402. Amplifier 1417 outputs the RF signal to an antenna coupler 1405 that directs the signal to antenna 1404. Antenna 1404 radiates the RF signal 1403 to a nearby cell tower 1402 which further directs the call data and voice to the desired destination.

An RF signal is also radiated from the cell tower 1402 to the cell phone antenna 1404. This RF signal is designated as a forward link signal. This forward link signal 1403 contains both control data for establishing the call and subsequently contains digitized voice data and other data for maintaining the call. The antenna 1404 directs the forward link RF signal through the antenna coupler 1405 to the receiver circuits 1408. The receiver circuit 1408 detects/decodes the audio signal and directs that signal to speaker 1409. During a routine, non-emergency call, the additional circuit components illustrated in FIG. 14 may remain inactive.

The cell phone with RF special signaling circuits may operate in the following manner when the user is making an emergency phone call.

When making an emergency phone call, the cell phone may operate as described previously for non-emergency calls except the additional special signal circuit components may become active. The operation of the now active RF special signaling circuits is now described. When an emergency call is initiated by the user, the control logic circuits 1411 may activate the special signal transmitter 1456 and the special signal receiver 1458. The special signal transmitter 1456 may generate an RF signal that is modulated with the cell phone's identification data and an identification code that indicates that an emergency call is being made. The identification data memory 1464 may send data to the data modulator 1466. The RF signal source 1465 generates an RF signal and sends that signal to data modulator 1466. The data modulator 1466 combines the RF signal and the data to produce a modulated RF signal. The output of data modulator 1466 is input to amplifier 1467 which amplifies the modulated RF signal and outputs the signal to the antenna coupler 1455. Antenna coupler 1455 directs the amplified RF signal to antenna 1454 from which the RF signal is radiated via the signal 1453 to a nearby RF signal monitoring device 1452 which receives the special signals 1453 from the cell phone antenna 1454.

The RF signal monitoring device 1452 may be connected to a system 1468 which monitors the status of connected devices. In the event an RF signal monitoring device senses an emergency call, the system 1468 may indicate that incident and may automatically notify emergency first responder personnel.

The monitoring device 1452 may also generate a forward link signal 1453 that is sent to antenna 1454. This forward link signal may contain location data, signal strength data and/or identification data pertaining to the RF signal monitoring device 1452. Antenna 1454 is connected to antenna coupler 1455 and may transfer the received forward link special RF signal to the antenna coupler 1455. Antenna coupler 1455 may in turn transfer the signal to the special signal receiver 1458. Receiver 1458 may detect/decode the information on the forward link special signal 1453 and may subsequently store that information in location data memory 1414. This location and/or identification data information from the RF signal monitoring device 1452 may subsequently be transferred to the emergency call center over the cell phone reverse link signal 1403 and through the cell tower 1402.

The RF special signal circuits are illustrated in FIG. 14 as separate system components, however the RF special signal functions may be performed by the primary cell phone transmitter and receiver components provided the frequency of the RF special signals are compatible with the primary cell phone transmitter and receivers. Specifically the functions of antenna 1454 may be performed by antenna 1404; the functions of antenna coupler 1455 may be performed by antenna coupler 1405, the functions of receiver 1458 may be performed by receiver 1408, the functions of transmitter 1456 may be performed by transmitter 1406, the functions of signal source 1465 may be performed by signal source 1415, the functions of data modulator 1466 may be performed by data modulator 1416, and the functions of RF amplifier 1467 may be performed by RF amplifier 1417.

Part 7: Cell Phones with Acoustic Special Signal Circuits

Cell Phones Circuit for Acoustic Special Signals

The special signal circuits comprising a cell phone with acoustic special signaling may include: acoustic frequency signal source, data memory for storing the identification data associated with the cell phone, data memory for storing the emergency call identifier data, data encoder for modulating the acoustic frequency signal with the identification and emergency call data, control circuits, acoustic frequency amplifier and transducer for conversion of electrical signals to acoustic waves.

Figure 15:
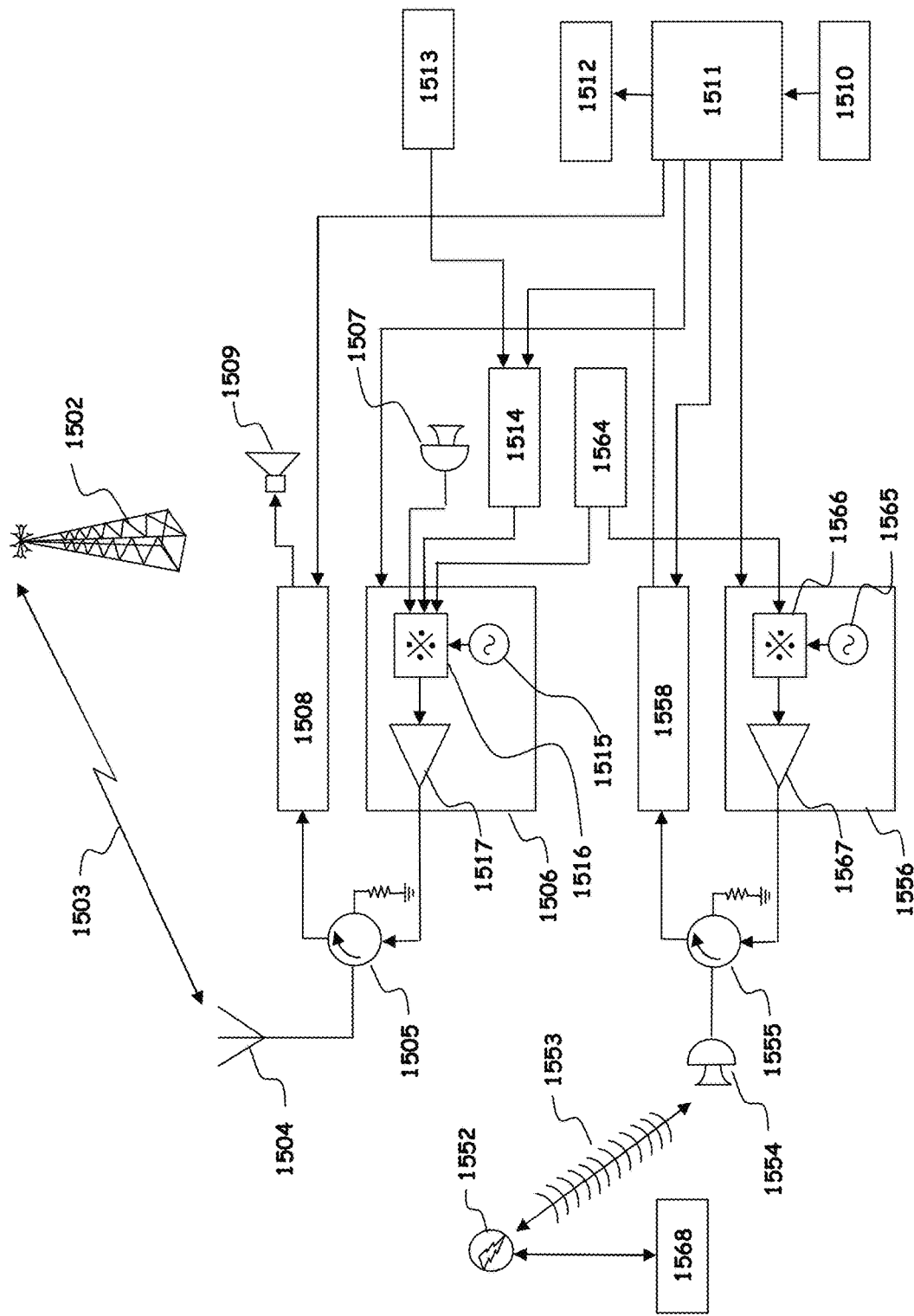
FIG. 15 illustrates a Cell Phone with Special Acoustic Signaling.

FIG. 15 illustrates a circuit block diagram for a cell phone with traditional RF circuits and with acoustic special signaling circuits. The circuits comprising each cell phone may include: Antenna 1504, antenna coupler 1505, acoustic transducer 1554, transducer coupler 1555, receiver circuits 1508 and 1558, speaker 1509, microphone 1507, transmitter circuits 1506 and 1556, signal sources 1515 and 1565, data modulators 1516 and 1566, signal amplifiers 1517 and 1567, GPS receiver 1513, location data memory 1514, cell phone identification data memory 1564, keypad 1510, control logic circuits 1511 and visual display 1512.

The cell phone with RF special signaling circuit may operate in the following manner when making a routine, non-emergency call. The user initiates a call by keystrokes, or voice commands via the keypad 1510 or microphone 1507. The keypad 1510 and microphone 1507 are connected to the control logic circuits 1511 which circuits are connected to visual display 1512, cell phone receiver 1508 and cell phone transmitter 1506. The control logic initiates a cell phone call by activating the receiver 1508, transmitter 1506 and by initiating and controlling data which is sent to the transmitter. This data may include but not be limited to the identification of the cell phone as contained in the identification data memory 1564, the dialed phone number and the digitized voice signal of the user. The transmitter 1506 includes an RF signal source 1515 which establishes the RF carrier frequency. The data modulator 1516 modulates the RF signal with the digitized data from the cell phone identification memory, the number called and the digitized voice of the caller. Amplifier 1517 increases the power level of the RF signal to a magnitude sufficient to communicate with a nearby cell tower 1502. Amplifier 1517 outputs the RF signal to an antenna coupler 1505 that directs the signal to antenna 1504. Antenna 1504 radiates the RF signal 1503 to a nearby cell tower 1502 which further directs the call data and voice to the desired destination.

An RF signal is also radiated from the cell tower 1502 to the cell phone antenna 1504. This RF signal is designated as a forward link signal. This forward link signal 1503 contains both control data for establishing the call and subsequently contains digitized voice data and other data for maintaining the call. The antenna 1504 directs the forward link RF signal through the antenna coupler 1505 to the receiver circuits 1508. The receiver circuit 1508 detects/decodes the audio signal and directs that signal to speaker 1509. During a routine, non-emergency call, the additional circuit components illustrated in FIG. 15 may remain inactive.

The cell phone with acoustic special signaling circuits may operate in the following manner when the user is making an emergency phone call.

When making an emergency phone call, the cell phone may operate as described previously for non-emergency calls except the additional special signal circuit components may become active. The operation of the now active acoustic special signaling circuits is now described. When an emergency call is initiated by the user, the control logic circuits 1511 may activate the special signal transmitter 1556 and the special signal receiver 1558. The special signal transmitter 1556 may generate an acoustic frequency signal that is modulated with the cell phone's identification data and an identification code that indicates that an emergency call is being made. The identification data memory 1564 may send data to the data modulator 1566. The acoustic frequency signal source 1565 generates an acoustic frequency signal and sends that signal to data modulator 1566. The data modulator 1566 combines the acoustic frequency signal and the data to produce a modulated acoustic frequency signal. The output of data modulator 1566 is input to amplifier 1567 which amplifies the modulated acoustic frequency signal and outputs the signal to the transducer coupler 1555. Transducer coupler 1555 directs the amplified acoustic frequency signal to acoustic transducer 1554 from which an acoustic signal is radiated via the signal 1553 to a nearby acoustic signal monitoring device 1552 which receives the special acoustic signals 1553 from the cell phone acoustic transducer 1554.

The Acoustic signal monitoring device 1552 may be connected to a system 1568 which monitors the status of connected devices. In the event an acoustic signal monitoring device senses an emergency call, the system 1568 may indicate that incident and may automatically notify emergency first responder personnel.

The monitoring device 1552 may also generate a forward link signal 1553 that is sent to acoustic transducer 1554. This forward link signal may contain location data, signal strength data and/or identification data pertaining to the acoustic signal monitoring device 1552. Acoustic transducer 1554 is connected to transducer coupler 1555 and may transfer the received forward link special acoustic frequency signal to the transducer coupler 1555. Transducer coupler 1555 may in turn transfer the acoustic frequency signal to the special signal receiver 1558. Receiver 1558 may detect/decode the information on the forward link special signal 1553 and may subsequently store that information in location data memory 1514. This location and/or identification data information from the acoustic signal monitoring device 1552 may subsequently be transferred to the emergency call center over the cell phone reverse link signal 1503 and through the cell tower 1502.

The special signal forward and reverse links 1553 between the cell phone and the special signal monitoring device 1552 may be acoustic frequency signals or any combination of acoustic and RF special signals. For example the reverse link signal 1553 from the cell phone to the special signal monitoring device 1552 may be acoustic and the forward link signal 1553 from the special signal monitoring device 1552 to the cell phone may be an RF signal, and vice versa.

Part 8: Notifying 911 Call Center and Fire Station

Operating Concept

The operating concept of a signal monitoring device is explained in the following example wherein it is installed in a fire alarm system. The special 911 signal monitoring devices may be installed in an addressable fire alarm system thus permitting the location (e.g., exact location) of each 911 alarm within a building to be known to some degree (e.g., accurately known).

The special fire alarm system Special 911 signal monitoring devices are constructed to receive signals from personal hand-held wireless devices making 911 calls. The personal hand-held wireless devices include: cell telephones, personal wireless smart phones, wireless equipped iPads, wireless Note-Pads and/or any other personal wireless communicators equipped to make 911, 112, or any other type of emergency or distress call.

These personal wireless communicators, when making a 911 or other distress calls, may be equipped to emit special radio frequency signals or acoustic signals or a combination of both which may allow the signal monitoring device to be equipped with simple radio frequency and acoustic sound decoders. The acoustic waves may be either audible or ultrasonic. The special signals emitted from the special personal wireless communicators may be in addition to the normal calling radio wave signals.

In addition to the preceding actions, the signal monitoring device that detects the 911 call may also send a special data signal to the cell phone or other wireless communicator indicating the location (e.g., exact location) of the signal monitoring device. The cell phone may then automatically forward the location information to a 911 call center.

The personal wireless communicators may operate in a traditional manner when making non-emergency calls between users. The fire alarm system may also operate in a traditional manner for detecting smoke and fire within a building facility. The connection of the special 911 signal monitoring devices into the fire alarm system may not necessarily alter the normal fire detection and reporting features of the fire alarm system.

In the event of some emergency situation, a person may initiate an emergency telephone call from their personal wireless communicators. The situation may be either a fire related emergency or an emergency other than a fire emergency. The personal wireless communicators, in addition to performing the traditional calling process, may also emit a special electromagnetic and/or acoustic signal of sufficient strength that may be detected by one or more nearby special 911 signal monitoring devices. The signal strength may be sufficient to activate one (e.g., only one in one embodiment) monitoring device located in the same area or room as the caller. The signal strength may be sufficient to activate more than one monitoring device located in the same area or room as the caller in another embodiment.

The activated signal monitoring devices may subsequently signal the fire alarm system control panel providing to the fire alarm control panel notification of a 911 alarm and the room location. The fire alarm system may display the location of the alarm on the annunciation panel located at the building entrance. Any person who sees the location of the distress call on the annunciation panel may respond alone or with others to the location of the emergency.

The fire alarm control panel may subsequently relay the information to local emergency responders such as a fire department or a police station or an urban central alarm monitoring facility. The emergency responders or the central alarm monitoring personnel may respond to the 911 alarm from the fire alarm system. This may permit emergency responders to arrive at the emergency location as soon as possible.

A local 911 call center may also receive the 911 voice call and may dispatch first responders based on location information received verbally from the user and automatically from the user's wireless device (cell phone). The 911 call center may attempt to correlate the fire alarm location information with the 911 caller location. In the event that a correlation between the fire alarm signal and the 911 call is not made rapidly, the emergency responders may respond to both the 911 voice caller's location and the fire alarm distress signal.

Part 9: Cell Phone Algorithm Flow Charts

Flow Charts

Figure 16:
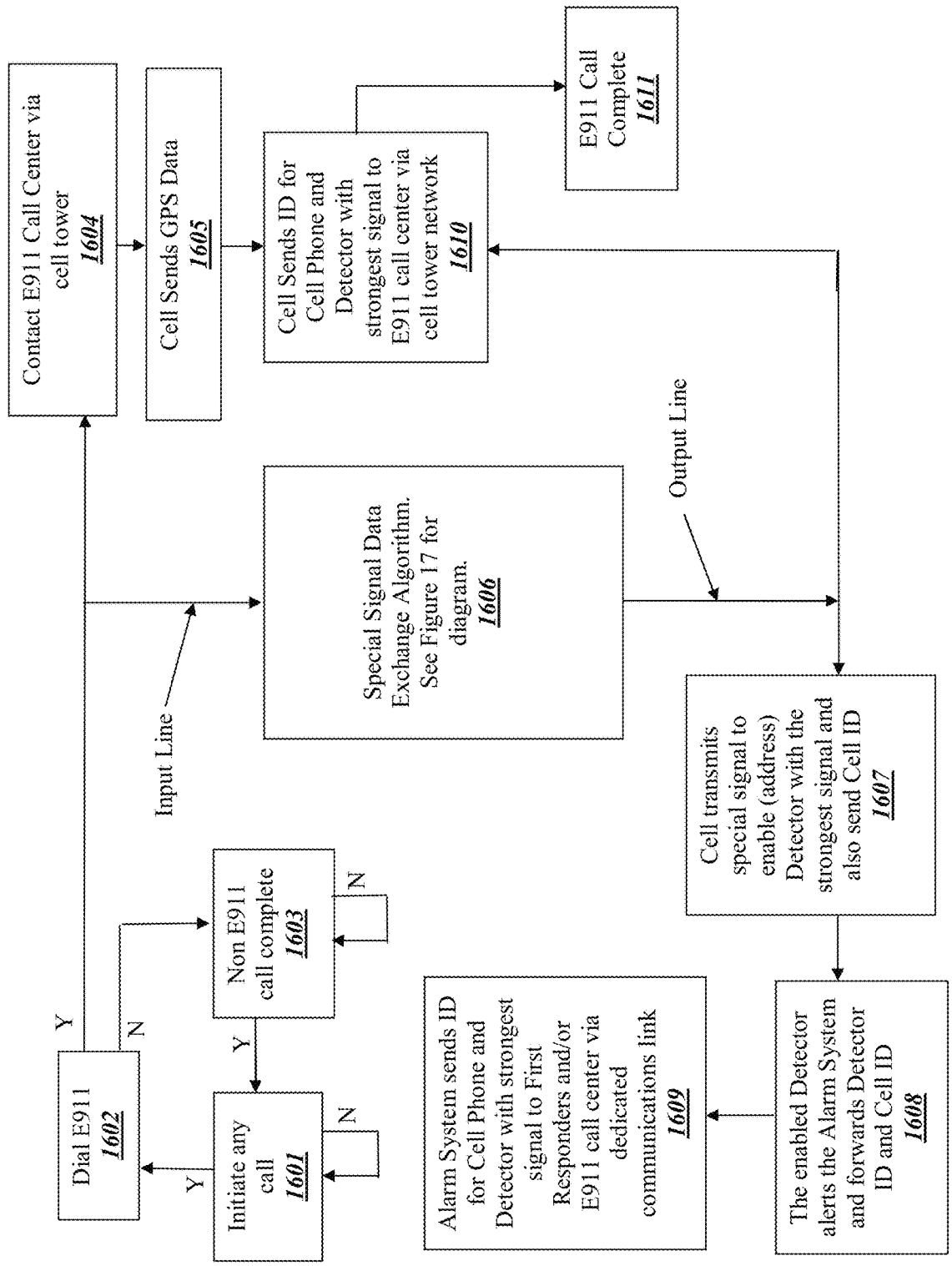
FIG. 16 illustrates a Flow Chart for the Operating Concept.
Figure 17:
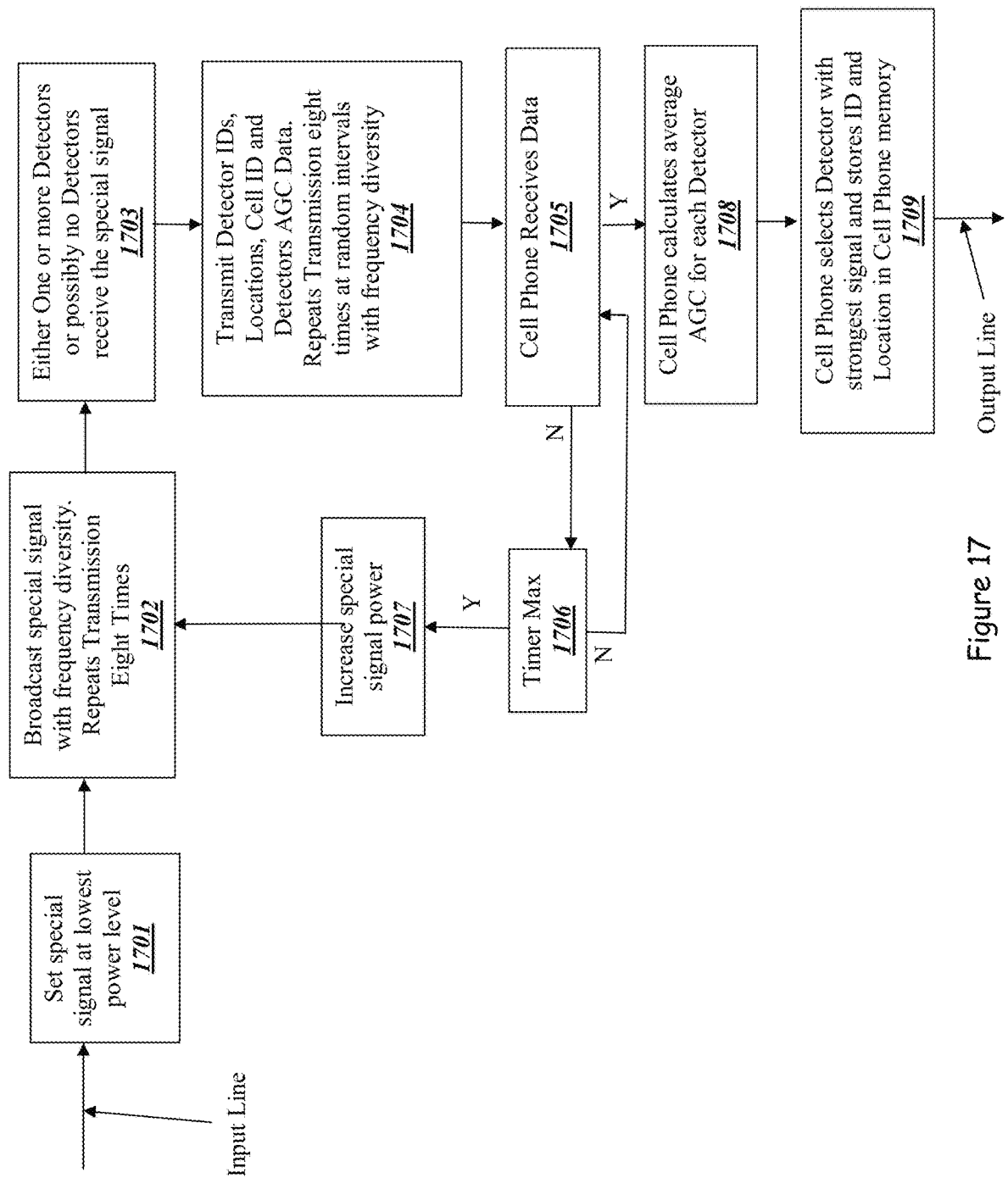
FIG. 17 illustrates a Flow Chart for a Special Signal Algorithm in one embodiment.

Flow charts at FIG. 16 and FIG. 17 illustrate the preceding operating concept and provide additional details for the special signals.

The activity awaiting a cell phone call is shown as block 1601; block 1602 is the decision of placing an emergency 911 call. If the decision is made to place a non-emergency call, the activity may proceed to block 1603. Block 1603 is the activity of completing a non-emergency call after which the diagram returns to the condition represented by block 1601.

If the decision is made to place an emergency call, the activity may proceed to block 1604 and block 1606. Block 1604 represents a traditional phone voice connection with an emergency call center via a cell tower network. Block 1605 represents the automatic transfer of GPS location data from the cell phone to the emergency call center. Meanwhile the block 1606 represents the cell phone, or other wireless device establishing a connection with one or more special signal detectors.

Block 1606 represents the activity illustrated in FIG. 17. Referring to FIG. 17, block 1701 represents the cell phone setting its special signal power to the lowest value. The cell phone then broadcasts a special signal indicating an emergency call and giving the cell phone ID; this activity is performed by block 1702. The data within the special signal is broadcast from the cell phone eight times, more or less, to ensure reception and to permit sufficient signal duration for detectors to measure and record signal strength. In addition, the broadcast may employ frequency diversity and error correction coding in order to ensure that multipath fading is mitigated.

Block 1703 represents signal reception at detectors; each detector may either receive or not receive the special signals depending on their distance from the cell phone. If no detector receives the signal in block 1703 then the process moves through block 1704 and block 1705 to Timer block 1706 and waits for the timer to attain a preset maximum value. The process then moves to block 1707 where the cell phone increases the special signal power in order to activate one or more special signal detectors. The cell phone then repeats block 1702 in which it re-broadcasts, with greater power, its special signal indicating an emergency call and giving the cell phone ID.

If one or more detectors receive the cell phone special signal as in block 1703, then each of those detectors may perform the activity of block 1704, each detector may transmit its detector ID, detector location, ID of cell phone that detector is responding to and detector AGC data. Each detector may also send time-of-arrival data for the received signal. Signal quality metrics other than AGC data may be used to measure signal strength at the detectors; bit error rate may be used as a measure of signal quality. The data within the special signal that is broadcast from the special signal detector may be repeated eight times, more or less, to ensure accurate reception. The data repetitions may be at random or pseudorandom intervals to prevent data collisions from two or more detector signals in response to the same cell phone. In addition, the broadcast may employ frequency diversity and error correction coding in order to ensure that multipath fading is mitigated.

If one or more detectors receive the cell phone special signal and respond with a special signal from each detector as described above, the cell phone may receive the special signals from the detectors; this reception activity is represented by activity block 1705. The cell phone may then proceed to activity block 1708 wherein the cell phone calculates the average value of the AGC data for each detector; signal quality metrics other than average AGC data may be used to measure signal strength. The cell phone then selects the data for the detector with the greatest signal strength and stores its ID and location data in the cell phone memory as represented by block 1709. In one embodiment, the AGC data and other metrics used for cell phone calculations are those metrics established at each detector for a signal received from a cell phone. In addition, the cell phone may also establish metrics for the received signals from one or more detectors and subsequently perform calculations based upon those metrics. Of course, alternate processing schemes and signal metrics may be utilized to select the detector that may be closest to the cell phone and located on the same floor as the cell phone. It is noted that the closest detector may be located on a floor above or below the location of the wireless device. For this reason, relying upon time-of-arrival information (or only upon a time-of-arrival information) for the location may result in an incorrect location. The cell phone may alternatively or additionally process the AGC data and/or the time-of-arrival data from one or more signal monitoring devices to estimate the location of the cell phone with respect to one or more of the signal monitoring devices and/or estimate the location of the cell phone within the facility. This location information may be stored in the memory of the cell phone.

Returning to FIG. 16, the cell phone may send a special signal addressed to the one detector whose ID was stored in the cell memory block 1709. The sending of that special signal to the detector is represented by block 1607. The detector may activate an alarm within the system to which it is connected as represented by block 1608. The alarm system may notify first responders and/or the E-911 call center as represented by block 1609.

The cell phone may also send data via the cell tower to the E-911 call center; that data may include the ID and/or location of the detector whose ID was stored in the cell memory by activity block 1709. The cell phone may also send location information that designates the cell phone location with respect to one or more of the signal monitoring devices and/or designates the cell phone location within the facility with respect to the structure of the facility. This cell phone data transmission is activity block 1610. The completion of the cell phone voice call to the E-911 cell center via the cell tower network is represented by block 1611.

Part 10: Mobile-Commerce Application for a Cell Phone with Special Signals

The application of special signal monitoring devices may be useful in mobile-commerce transactions, particularly transactions that request delivery of merchandise to the current location of a consumer with a wireless device. Special signaling may provide a merchant with a consumer's current location. Special signaling may also provide route and guidance information for product delivery. Route and guidance information may provide a method of guiding a delivery person through a building to the current location of a consumer within a building or facility. Route and guidance information may be presented visually in the form of a map and/or building floor plan with a linear path to the destination location. Route and guidance information may also be presented as a series of narrative or aural instructions. An example of guidance may be: Proceed to Elevator 1, Go up to $3^{rd}$ floor, Turn right and walk forward to Room 305. The location for the consumer may be the location established when making the transaction or the location may be the updated current location of the consumer after making the transaction. The preference may be designated by the consumer when placing the order or by the delivery person.

Figure 19:
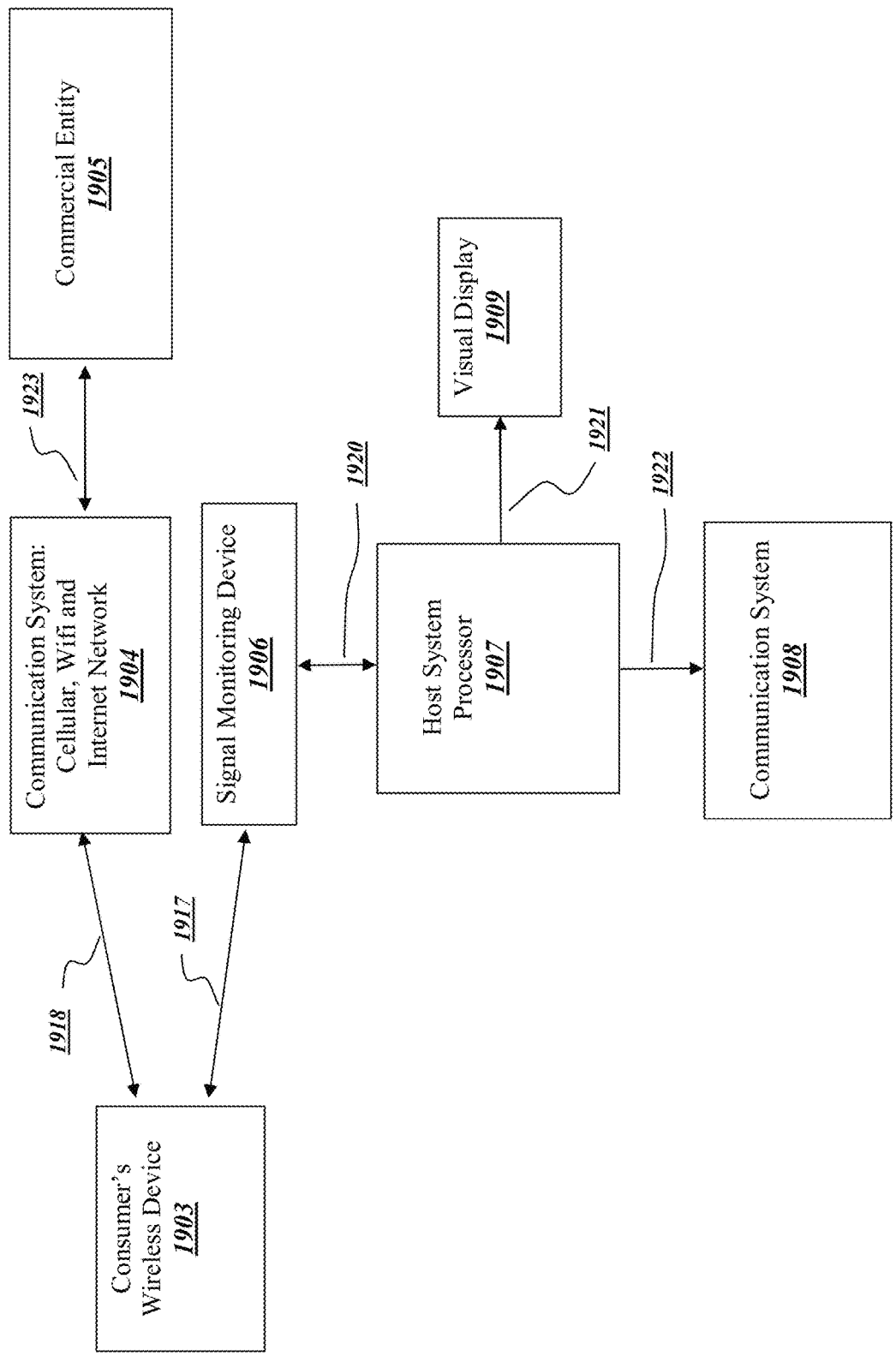
FIG. 19 illustrates a Block Diagram for a Wireless Device System.

Mobile-Commerce Purchase Request Description:

Block Diagram at FIG. 19 illustrates a mobile-commerce operating concept for a cell phone or other personal wireless device and illustrates the various signals and components.

FIG. 19 illustrates a cell phone or other Wireless Communications Device 1903 with access to cellular systems, Wifi and internet systems 1904, Bluetooth links and in addition having Special Signaling circuits for access to one or more Monitoring Devices 1906 via the Special Signals 1917.

The user of a Wireless Communications Device 1903 may initiate cellular, Wifi or internet connections 1918, 1923 via the Communications System 1904 to a commercial entity 1905 in order to purchase an item for delivery to the user's location. The commercial entity 1905 may be a website for retail sales and delivery, a local retail merchant or any other commercial sales and delivery entity. When making a call, the Wireless Communications Device 1903 may additionally broadcast a special signal 1917 to one or more nearby Monitoring Devices 1906. This special signal may be described as a location request signal.

In response to receiving the location request special signals, the one or more Monitoring Devices may subsequently send location information to the Wireless Communications Device 1903. The exchange of special signals for the purpose of establishing location information is further described in Part 2 through Part 9 of this narrative description. The Wireless Communications Device may then forward the location information to the commercial entity 1905 over the Communications System 1904. The Monitoring Device 1906 may also forward the location information 1920 to the Monitoring Device's host Building System Processor 1907.

The host Building System Processor 1907 may further send the location information 1921 to a local Visual Display 1909 to assist a delivery person in rapidly locating the Wireless Communications Device 1903. The host Building System Processor 1907 may further send the location information 1922 via a Communication System 1908 to the same Commercial Entity 1905. The Communication System 1908 may be the same system as Communication System 1904. The Host Building System Processor 1907 and Communications System 1908 thus provide an alternate communications path for location information to reach a desired destination such as the Commercial Entity 1905.

Mobile-Commerce Guide Mode Operation

Figure 20:
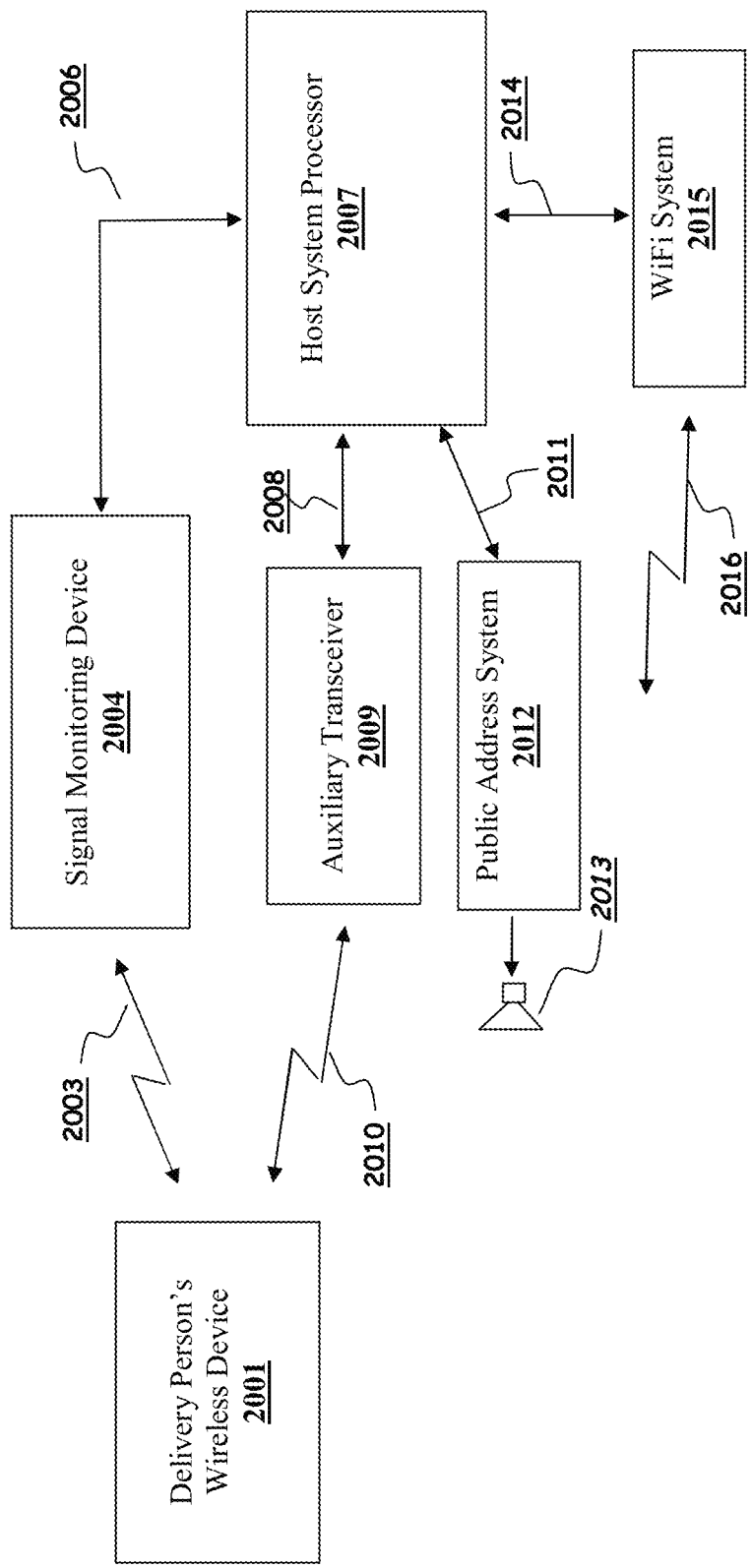
FIG. 20 illustrates Signals and Data for Wireless Device Operation and FIG. 21 illustrates Route and Guidance Concept.

The following is a description of the signal monitoring devices and their host system processor providing mobile-commerce delivery personnel with route and guidance information, through their wireless devices, to facilitate rapidly finding the specific delivery destination. That location may be either the consumer's current location or the location within the building from which the delivery order was initiated. FIG. 20, along with the following description, illustrate the interactions among the delivery person's wireless device 2001, the signal monitoring devices 2004 and the host building system processor 2007. In one embodiment the host system is a fire alarm system and the host system processor is a fire alarm control panel that is equipped to perform the functions described herein.

The signal monitoring devices have been described as providing delivery location information to a merchant when a consumer is purchasing an item. These signal monitoring devices may be additionally used to guide delivery personnel to the delivery location within a building or facility.

The signal monitoring devices 2004 operating in conjunction with the host system processor 2007 may exchange special signals 2003 with a delivery person's wireless device 2001 upon entering and remaining within a building.

To assist the delivery personnel in reaching the specific delivery location within the building or facility, the signal monitoring devices and host system processor may detect the presence of the delivery person's wireless device and receive device identification information. This may result in a further exchange of signals between the delivery person's wireless device and the nearby signal monitoring devices to establish the signal monitoring device closest to the wireless device and thereby, in one embodiment, designate the location of the delivery person's wireless device. This procedure has been previously described in detail wherein AGC and/or other signal data are used to select the closest signal monitoring device. Other embodiments may be employed to establish the location of the Wireless Device with respect to the signal monitoring devices and/or with respect to the facility structure. The delivery person's wireless device may additionally send data 2003 to the signal monitoring device 2004 and to the host system processor 2007 indicating that the delivery person's wireless device is searching for a specific delivery destination location and the sent data identifies the specific location in the building that is the desired destination of the delivery person. Once again, that location may be either the consumer's current location or the location from which the delivery order was initiated within the building. This exchange of data signals constitutes a request for route and/or guidance information for the delivery person's wireless device to travel to the wireless device of the consumer that requested the delivery.

One or more signal monitoring devices 2004 may forward the location information 2003 from the delivery person's wireless device 2001 via signal 2006 to the host system processor 2007 for use in creating a route through the building from the present location of the delivery person's wireless device to the specific location of the consumer that placed the mobile-commerce order to be delivered.

The host system processor 2007 may create route and guidance information for the delivery person's wireless device to reach the desired destination and may send that information to the delivery person's wireless device. This route and guidance information may be sent from the host system processor via the signal monitoring devices 2004 or directly via an auxiliary transceiver 2009 that is connected via connection 2008 to the host system processor 2007. The route and guidance information may also be conveyed to the delivery person aurally via voice instructions announced via loud speakers 2013 of a public address system 2012 that is interfaced 2011 with the host system processor 2007. The route and guidance information may also be conveyed via Wifi signals 2016 to the delivery person's wireless device. The host system processor may be connected to a Wifi system 2015 and send and receive information via connection 2014. The route and guidance information may also be sent to a local visual display 1909 illustrated at FIG. 19.

The delivery person's wireless device 2001 may display the route and guidance information sent from the host system processor 2007. The wireless device 2001 may present the information aurally and/or visually. The visual presentation may be by either text or graphics. An example of a graphic presentation may be a floor plan with an indication of the path from the delivery person's present location to the specific delivery location requested by the consumer. Once again, that location may be either the consumer's current location or the location from which the delivery order was initially made within the building. It is this specific delivery location that the route and guidance information may facilitate the delivery person in rapidly finding.

Mobile-Commerce Tracking and Guidance Information Updates

If the building is a multistory building, the consumer's delivery request may have originated on a floor above or below the present location of the delivery person upon entering the building. In this situation the processor 2007 may provide the delivery person with route and guidance information for each of the various floors through which the delivery person travels to reach the final delivery destination. For multistory buildings, the route and guidance information may be automatically updated by the host system processor 2007 and transmitted to the delivery person's wireless device 2001 as the delivery person travels toward the destination. This is possible since the host system processor 2007 may repeatedly receive location data for the delivery person's wireless device 2001; this data may be repeatedly provided by signal monitoring devices 2004 along the route of the delivery person's wireless device 2001 moving toward the destination. The host system processor 2007 may track the delivery person's wireless device 2001 by repeatedly reestablishing the location of that wireless device via an exchange of special signals 2003 as previously described for the method of locating cell phones with special signals in conjunction with signal monitoring devices.

The route and guidance information may be sent to the delivery person's wireless device 2001 via transmitted special signals 2003 from one or more signal monitoring devices 2004 or directly 2010 via an auxiliary transceiver 2009, that is connected 2008 to the host system processor 2007. The route and guidance information may also be conveyed via Wifi signals 2016 if the wireless device 2001 is so equipped to receive. Wifi system 2015 may be interconnected 2014 with the host system processor 2007. The route and guidance information may also be conveyed to the delivery person aurally via voice instructions announced via a public address system 2012, with loud speaker 2013, that is interfaced 2011 with the host system processor 2007. The route and guidance information may also be sent to a local visual display 1909 illustrated in FIG. 19.

In some circumstances, the consumer that ordered the merchandise for delivery and their wireless device may move away from their initial location. When this occurs, the host system processor in conjunction with the signal monitoring devices may track the location of the consumer person with their wireless device. The host system processor may track a wireless device by repeatedly reestablishing the location of the device via an exchange of special signals as previously described for the method of locating cell phones with special signals in conjunction with signal monitoring devices. Under these circumstances the host system processor may recalculate and revise the route and guidance information and send that revised information to the delivery person's wireless device.

The special signal circuits within the consumer's wireless devices would remain active until reset. The reset of the special signals may take place as a result of one or more of the following events. The reset may be accomplished manually by the user or may be accomplished automatically based on a timer within the building system processor 2007; the reset may be accomplished automatically based on a timer within the consumer's wireless devices; the reset may be accomplished by the building system processor 2007 when the delivery person's location is nearby or collocated with the location of the consumer placing the retail delivery order and their wireless device.

Part 11: Handheld Radio Operations

Application of Special Signal Monitoring Devices to Hand Held Radios

The foregoing narrative has described the use of an electronic device unit for detection of emergency calls initiated from cell phones and from other personal wireless communications hand held units wherein the electronic device units for detection of emergency calls is installed and integrated as a component detector of a fire alarm system, intrusion alarm system, surveillance system, access control system, Supervisory Control and Data Acquisition (SCADA) system, computer network system, internet access system, telephone system and/or any other building and facility monitoring and data systems. The narrative has also described cell phones and other personal wireless communications hand held units equipped to send and receive special signals that interact with the electronic device units for detection of emergency calls.

The application of the electronic device units for detection of emergency calls may be expanded to include determining location of handheld radios used by emergency responders such as police officers, fire fighters, emergency medical personnel, military National Guard personnel, Homeland Security coordinators, FBI personnel and other emergency personnel. The electronic device units for detection of emergency calls may also be referred to as special signal monitoring devices.

Handheld radio systems may include more sophisticated trunked radio systems or simple manually selectable multichannel radios. In either case, the channel/frequency selections available to a user are limited in order to provide communications with a select group of persons normally within the user's parent organization.

As with the cell phones described in the foregoing narrative, the handheld radios may also be equipped with special signal circuits that send and receive RF and/or acoustic special signals to and from local special signal monitoring devices that are connected to a host system.

The special signals exchanged with the special signal monitoring device may include radio identification designation, organization affiliation, "Talk Group" affiliation, signal monitoring device identification designation, location information, AGC value, signal strength value, signal quality, data errors and other data.

There may be one or more differences in the exchange of special signals from handheld radios compared with cell phones. One difference is that a radio may not automatically initiate an alarm through a special signal monitoring device. Another difference is that the data exchange via special signals between the radios and the special signal monitoring devices may be intermittent, continuous or periodic and may commence when the radios are within signaling distance of the special signal monitoring devices. This feature permits the special signal monitoring devices to continuously monitor one or more radios within signaling distance.

The special signals sent from the special signal monitoring devices and received at radios (e.g., each radio) may include the identification and location information not only for the receiving radio, but additionally for one or more other radios active within the host systems network. These other radios may include those from parent organizations (e.g., all parent organizations) in addition to those of a particular user's parent organization. Each radio may be equipped to display the information associated with the other various radios active within the host system's signaling distance.

Each radio user may desire to call a nearby user from a specific organization and/or may desire to call one or more of the closest (nearby) radios. The former may be desired if a specific skill is desired and the latter may be desired if the user is in distress and immediate help is desired.

What has been described up to this point is the signaling that is exchanged between two or more handheld radios and one or more special signal monitoring devices. This information may permit radio users to know their current location within a facility (e.g., at all times). This information may also permit each radio user to be aware of the presence of other nearby radio users, their parent organization and their location information.

In order to ensure that voice communications is possible between radios from disparate organizations, a means for verbal communications must (and/or may) be provided.

If the radios (e.g., all radios in one embodiment) are affiliated with the same trunked radio system, then interoperable voice communications may be feasible (or at least easier). Alternatively, if the radios are from disparate trunked radio systems that use differing technologies, an alternate scheme may be provided that permits voice communications between the disparate radios.

Figure 18:
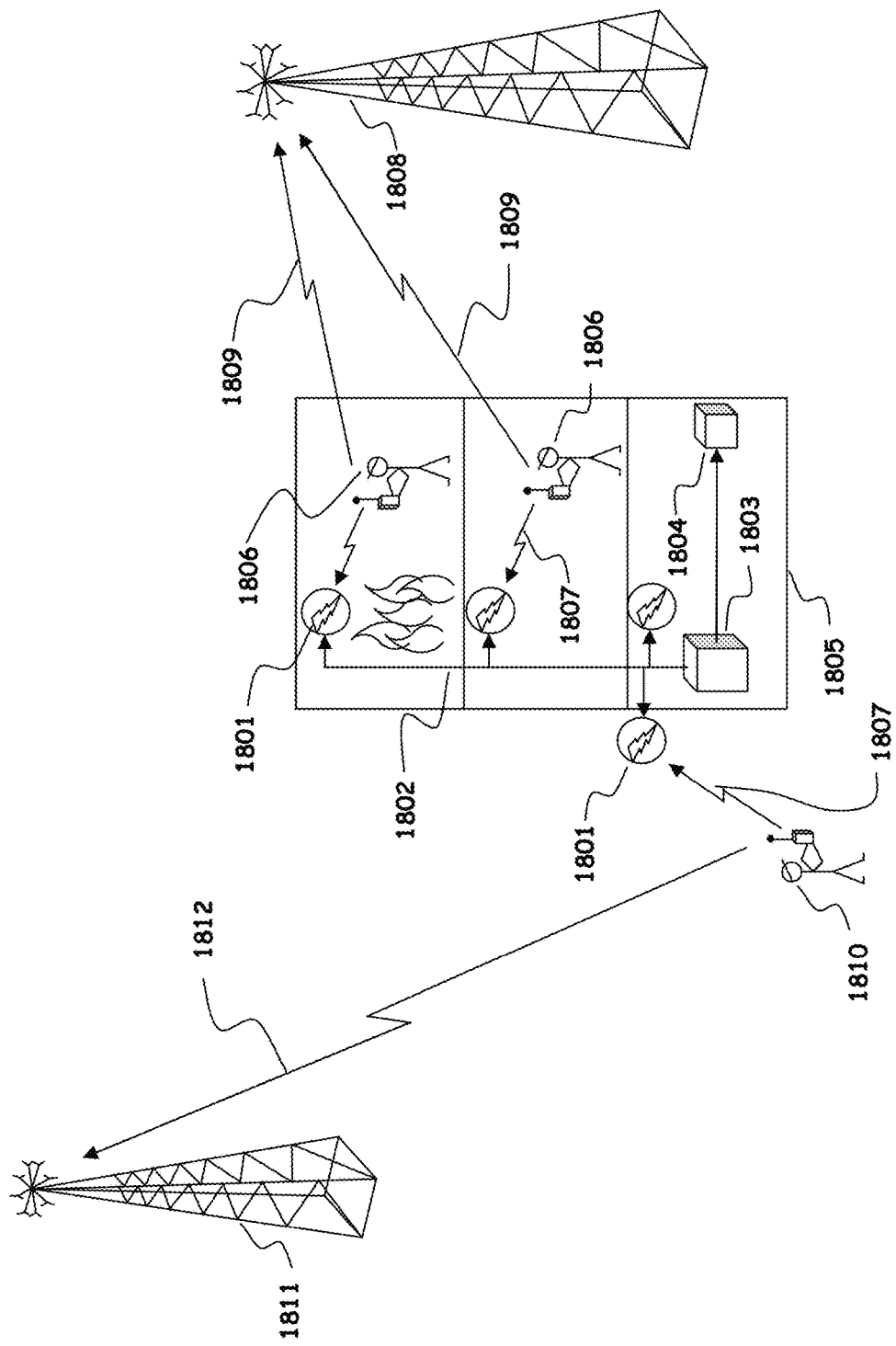
FIG. 18 illustrates Handheld Radios using Signal Monitoring Devices in one embodiment.

FIG. 18 illustrates four special signal monitoring devices 1801 with interconnecting cables 1802 located within a facility 1805 and, in one embodiment, connected to a host system controller 1803 such as a fire alarm system controller. Within and adjacent the facility are also illustrated three hand held radios 1806 and 1810. Special signals 1807 that convey identification information are transmitted from each radio and are received by one or more special signal monitoring devices. The special signal monitoring devices may each respond by transmitting special signals back to the radios. These special signals to each radio may generally convey different information that is specific to each radio. These special signals are illustrated as 1807. The special signals transmitted by each special signal monitoring device and received by one or more radios may convey location information, signal monitor device identification, signal strength values, radio identification for the receiving radios and radio identification for one or more other nearby radios emanating special signals to the special signal monitoring devices and parent organization for each radio identified. Each special signal monitoring device may respond to one or more radios but not necessarily all radios within the host system.

FIG. 18 also includes a host system controller 1803 and an annunciation panel 1804 that may be a component of the host system. This annunciation panel may normally be equipped to display graphic and text information for alarms from special signal monitoring devices. A radio user may or may not elect to initiate an alarm through a nearby special signal monitoring device with which the radio has exchanged special signal information.

FIG. 18 also illustrates signals 1809 and 1812 for voice transmissions to and from each radio to antenna towers 1808 and 1811. These antenna towers 1808 and 1811 and radios 1806 and 1810 may belong to the same trunked radio system. The radios 1806 and 1810 communicate via the towers 1808 and 1811. The three radios may be assigned to the same "Talk Group" in which they can converse with each other via the towers 1808 and 1811. If, however, the radios are assigned to different parent organizations and thus to different "Talk Groups," they may not be able to communicate under normal circumstances. In one embodiment, reassigning the radios to a common "Talk Group" may permit the radios to communicate. (In a different embodiment, permitting the radios to communicate may be accomplished by another method than reassigning.)

If antenna tower 1808 and radios 1806 belong to one trunked radio system and tower 1811 and radio 1810 belongs to a second disparate trunked radio system, the radios 1806 and 1810 may not be assigned to the same "Talk Group" and thus may not be capable of communicating with each other.

Both of the preceding difficulties may be overcome if the radios of differing parent organizations are equipped with circuits that provide a common "Talk Group" in both situations: first in the situation where radios (e.g., all radios) are on a common trunked radio system and a second in the situation where one or more radios are on differing trunked radio systems. The common "Talk Group" in these situations may include a non-trunked, simple half-duplex, line-of-sight radio channel with or without the benefit of a repeater tower.

In the preceding two situations the common "Talk Group" communications feature may be enabled by signals emanating from a special signal monitoring device that is common to two or more radios. A special signal monitoring device is common to two or more radios if the monitoring device is within a distance that permits exchange of special signals with the radios.

Aside from facilitating voice communications via a common "Talk Group," the use of handheld radios equipped with special signaling and a building system equipped with special signal monitoring devices may provide each radio user with that user's present location. This location information may be updated periodically or continuously. Each handheld radio may visually display the location information, provide an aural announcement of the location information and/or automatically forward the location information via signals to another radio and/or to a parent organization monitoring equipment.

Handheld Radio Guide Mode Operation

The signal monitoring devices and their host system processor may provide emergency personnel with route and guidance information, through their portable radios, to assist emergency personnel in rapidly finding and assisting a 911 caller within a building. The signal monitoring devices may be used in emergency situations wherein a cell phone user has made a 911 call and emergency personnel with portable radios are en route to assist that person. The signal monitoring devices may facilitate the emergency personnel in rapidly arriving at the caller's location within the building.

The signal monitoring devices operating in conjunction with the host system processor may exchange special signals with emergency portable radios that are equipped with special signaling when the radios enter and remain within a building and the emergency personnel are searching for the cell phone location designated by the 911 call. This route and guidance feature for Handheld Radios may be implemented following the same approach described for mobile-commerce delivery procedures in Part 10 of this description. This route and guidance feature for portable radios may be implemented in a manner such that the 911 caller's wireless device functions in the same manner as the m-commerce consumer's wireless communications device in establishing a route destination and wherein the emergency responder's portable radio functions in the same manner as the delivery person's wireless device in requesting or creating route and guidance information.

Part 12: Host System Control Panel

The host system control panel, also described as the host system processor, is the central controller for a monitoring system. The host system described herein contains a central processor, data memory, monitoring device network, network wiring, public address system interface, Wifi system interface, auxiliary transceiver, a visual display with user keypad and a communications link to a central alarm monitoring facility. It is recognized that there may be embodiments that do not contain all of these components and/or may contain additional components. The host system processor monitors the status of the plurality of monitoring devices connected to the network. This is traditionally accomplished in systems such as fire alarm systems using two-conductor ring networks with copper conductors, however the networks may alternatively be wireless. The data signals for individual devices may be encoded and/or multiplexed in various ways. This may be accomplished in a manner that allows each monitoring device to be identified and the data signal to travel over the network without data collisions and errors. The networks to which the monitoring devices are connected may be a ring network, a star network, it may be wired, or it may be wireless or some combination of these. It is recognized that other networks may be used. Although the Host System Control Panel is described herein as a single central unit, it is also possible for there to be multiple processors and/or multiple controllers in a distributed processing scheme.

Host System Control Panel "Talk Group" Tracking

FIG. 18 illustrates four special signal monitoring devices 1801 with interconnecting cables 1802 located within a facility 1805 and connected to a host system controller 1803 such as a fire alarm system controller. Within and adjacent the facility are also illustrated three hand held radios 1806 and 1810. Special signals 1807 that convey identification information, e.g. "Talk Group" affiliation, are transmitted from each radio and are received by one or more special signal monitoring devices. Part 11 described the operation of portable radios and the use of "Talk Group" affiliation. The use of handheld radios equipped with special signaling and a building system equipped with special signal monitoring devices connected to a host system controller may provide each radio user with that user's present location. This location information may be updated periodically or continuously. The host system controller may also automatically forward the location information of one or more radios within a "Talk Group" via signals to another radio within the "Talk Group" and/or to a parent organization monitoring equipment.

Host System Control Panel Connectivity

The host system processor 2007, illustrated at FIG. 20, includes connections with an RF transceiver 2009, a public address system 2012, a Wifi system 2015 and a plurality of signal monitoring devices 2004.

The same host system processor 1907, illustrated at FIG. 19, includes connections with a visual display 1909, a communication system 1908 and a plurality of signal monitoring devices 1906. A host system may include any combination or all of the connected devices and equipment illustrated in FIGS. 19 and 20.

The tasks performed by the host system processor with respect to the signal monitoring devices may include actively interrogating each of the signal monitoring devices periodically for the current alarm status of each monitoring device and/or may include accepting interrupt data from the signal monitoring devices. A host system processor may interface with a visual display 1909 located near the main entrance of a building for viewing by emergency personnel. The status of the plurality of monitoring devices may be displayed on the visual display 1909 and may additionally be sent via communications system 1908 to an off-site central alarm monitoring facility.

In embodiments in which the signal monitoring devices feature both forward and reverse link signaling to a cell phone, radio or other wireless device, the host processor may exercise two way data communications with the cell phone, wireless device or radio users via one or more signal monitoring devices 2004, or via Wifi 2015 signals or via an auxiliary transceiver 2009. A public address system 2012 may also be used to give aural information or instructions to a wireless device or radio user. The information exchanged may include wireless device identification, radio identification and signal monitoring device identification, signal quality data, location data and/or route and guidance data. Furthermore, since the same host system processor 1907, illustrated at FIG. 19, includes connections with the communications system 1908 and a plurality of signal monitoring devices 1906 and since the signal monitoring devices may have both forward and reverse links with a wireless device 1903, the host system processor may provide connectivity between a wireless device 1903 within the building and the communications system 1908. The communications system may include a cellular system and/or an internet system.

Host System Control Panel Location and Navigation Services

In embodiments previously described, the location of a cell phone, wireless device or radio user may be established wherein one or more signal monitoring devices report data (to the cell phone, wireless device or radio) indicating the signal quality (AGC, etc.) for the received location request, alarm or alert special signal broadcast by the user's device. The cell phone, wireless device or radio would then process that data and select the monitoring device that reported the best received signal quality. The location of that selected monitoring device would (in one embodiment) be adopted as the location of the cell phone, wireless device or radio user.

In another embodiment, the host system processor may calculate a wireless device or radio user's location using signal quality data received by one or more signal monitoring devices in embodiments in which that information is forwarded to the processor by the monitoring devices. The calculated location information may be sent by the host system processor back to the corresponding wireless device or radio.

The host system processor may create route and guidance information for a cell phone, wireless device or radio user (second user) that desires to navigate to a destination within the building. The processor would be equipped with navigation software, provided with continuously updated second user location information from the signal monitoring devices and also provided with the destination location as well. The destination location may be provided by a first user's wireless device when making a mobile commerce order or be provided by a 911 caller's location that was established when a 911 call was placed. In addition, the processor would have architectural plan information and the location of signal monitoring devices (e.g., all the signal monitoring devices in one embodiment) (e.g., that would provide waypoints) relative to the architectural plans.

Figure 21:
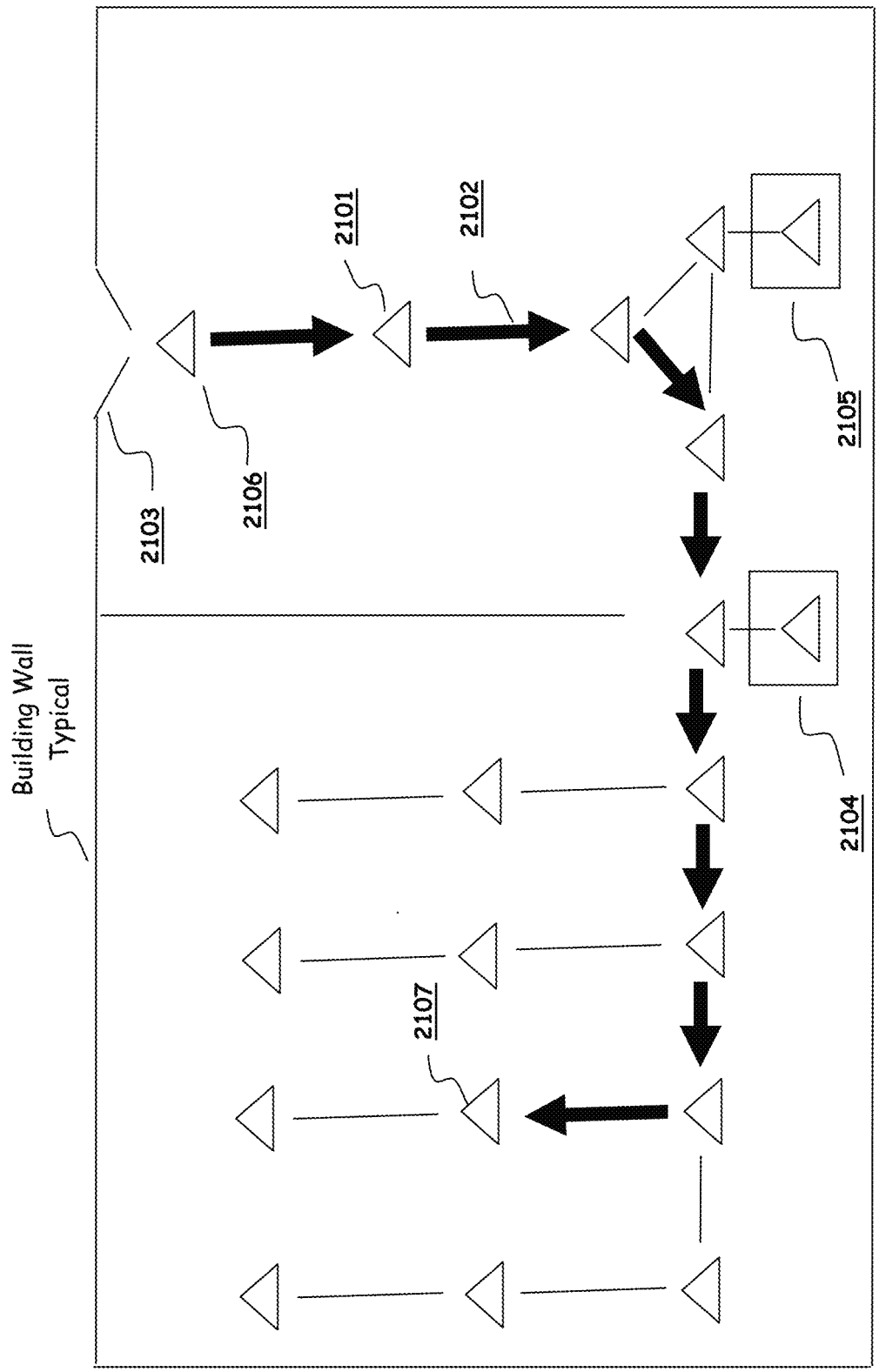

FIG. 21 illustrates a typical route superimposed on a typical architectural plan. Other architectural plans and routes having a differing destination location and waypoint locations within the plan are possible. The plan illustrates monitoring device locations as waypoints indicated by triangles (typical of 2101) and connecting lines (typical of 2102) that are route segments. Also shown are the building entrance 2103, elevator 2104 and stairwell 2105. A sequence of connected route segments from a present location 2106 of a second user's wireless device to a destination location 2107 may constitute a complete route illustrated by the sequence of heavy lines. For a multistory building wherein the destination location is on a floor above or below the entry doors, the processor may provide a route segment to the elevator 2104 or stairwell 2105 and may additionally create and provide the route and guidance data for the additional floor using the architectural plan data and waypoint data for that floor.

The host system processor may create route and guidance information for any combination of present locations and destinations.

In lieu of the host system processor calculating route and guidance information, a second user's cell phone, wireless device or radio processor may create route and guidance information for the second user to navigate to a destination within the building. The second user's cell phone, wireless device or radio processor would be equipped with navigation software which may reside internal to the device or be cloud based. The cell phone, wireless device or radio would be provided with continuously updated location information from the signal monitoring devices and also provided with the destination location as well. The destination location may be provided by a first user's wireless device when making a mobile commerce order or be provided by a 911 caller's location that was established when a 911 call was placed. This destination location data may reside in the host system processor and may be sent from the host processor to the second user's cell phone, wireless device or radio that requests, receives, and/or requires the destination data. In addition the second user's cell phone, wireless device or radio processor would have architectural plan information and the location of signal monitoring devices (that would provide waypoints) relative to the architectural plans. This architectural and waypoint data (and also the navigation software) may be resident in the second user's cell phone, wireless device or radio or may be downloaded to the second user's cell phone, wireless device or radio. The second user's cell phone, wireless device or radio processor may create a route for any combination of present locations and destinations. In another embodiment, a processor other than that of the host system and the second user's cell phone, wireless device or radio may host the navigation software, architectural information, waypoint data, destination location data and second user's wireless device location and thereby create the route and guidance information and send that information to the second user's cell phone, wireless device or radio. This embodiment may include cloud based applications.

Part 13: Computing Embodiments

Computing Modules

Figure 13:
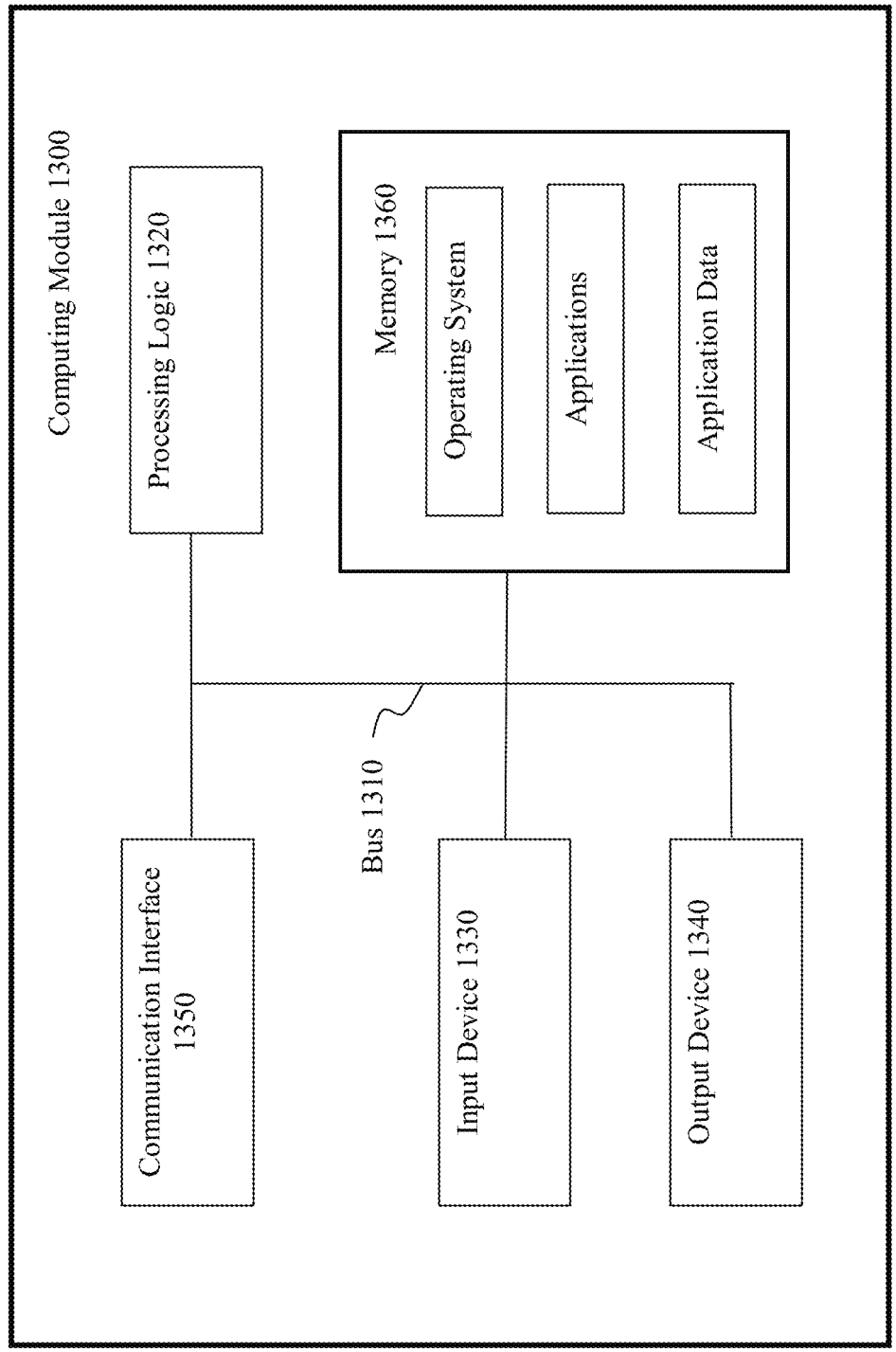
FIG. 13 illustrates a computing module.

Devices described above (e.g., cell phones, portable radios, wireless medical devices, signal monitoring devices, cell towers, SCADA system components, fire alarm system components, computers, processors, systems, host systems) may include a computing module in addition to or as an alternative to the hardware described above. FIG. 13 is a block diagram of exemplary components of a computing module 1300. Computing module 1300 may include a bus 1310, processing logic 1320, an input device 1330, an output device 1340, a communication interface 1350, and a memory 1360. Computing module 1300 may include other components (not shown) that aid in receiving, transmitting, and/or processing data. Moreover, other configurations of components in computing module 1300 are possible.

Bus 1310 may include a path that permits communication among the components of computing module 1300. Processing logic 1320 may include any type of processor or microprocessor (or families of processors or microprocessors) that interprets and executes instructions. In other embodiments, processing logic 1320 may include an application-specific integrated circuit (ASIC), a field-programmable gate array (FPGA), etc.

Communication interface 1350 may include a transceiver that enables computing module 1300 to communicate with other devices or systems. Communication interface 1350 may include a transmitter that converts baseband signals to radio frequency (RF) signals and/or a receiver that converts RF signals to baseband signals. Communication interface 1350 may be coupled to one or more antennas for transmitting and receiving RF signals. Communication interface 1350 may include phase shifters or time delays for modulating received and/or transmitted signals. Communications interface 1350 may include an acoustic and/or ultrasonic transmitter and/or receiver for communicating with other devices. Communication interface 1350 may include a network interface card, e.g., Ethernet card, for wired communications or a wireless network interface (e.g., a WiFi) card for wireless communications. Communication interface 1350 may also include, for example, a universal serial bus (USB) port for communications over a cable, a Bluetooth wireless interface, a radio-frequency identification (RFID) interface, a near-field communications (NFC) wireless interface, etc.

Memory 1360 may store, among other things, information and instructions (e.g., applications and an operating system) and data (e.g., application data) for use by processing logic 1320. Memory 1360 may include a random access memory (RAM) or another type of dynamic storage device, a read-only memory (ROM) device or another type of static storage device (e.g., non-transient), and/or some other type of magnetic or optical recording medium and its corresponding drive (e.g., a hard disk drive).

The operating system may include software instructions for managing hardware and software resources of computing module 1300. For example, the operating system may include GNU/Linux, Windows, OS X, Android, an embedded operating system, etc. The applications and application data may provide network services or include applications, depending on the device in which the particular computing module 1300 is found.

Input device 1330 may allow a user to input information into computing module 1300. Input device 1330 may include a keyboard, a mouse, a pen, a microphone, an audio capture device, an image and/or video capture device, a touch-screen display, etc. Some devices, such as the nodes, may be autonomous, may be managed remotely, and may not include input device 1330. In other words, some devices may be "headless" and may not include a keyboard, for example.

Output device 1340 may output information to the user. Output device 1340 may include a display, a printer, a speaker, etc. As another example, the nodes may include light-emitting diodes (LEDs). Headless devices, such as one or more of the nodes, may be autonomous, may be managed remotely, and may not include output device 1340.

Input device 1330 and output device 340 may allow a user to activate and interact with a particular service or application. Input device 1330 and output device 1340 may allow a user to receive and view a menu of options and select from the menu options. The menu may allow the user to select various functions or services associated with applications executed by computing module 1300.

Computing module 1300 may perform the operations described herein in response to processing logic 1320 executing software instructions contained in a computer-readable medium, such as memory 1360. A computer-readable medium may include a physical or logical memory device. The software instructions may be read into memory 1360 from another computer-readable medium or from another device via communication interface 1350. The software instructions contained in memory 1360 may cause processing logic 1320 to perform processes that are described herein.

Part 14: Embodiments

One or more embodiments are listed below. Other embodiments are also described above. The embodiments listed below may employ the computing module described above.

Embodiments for Route and Guidance

A system comprising: a first wireless communications device, a second wireless communications device, a host system, wherein the host system comprises a host system processor, the system further comprising a plurality of monitoring circuits, wherein the plurality of monitoring circuits are located at known locations throughout a building interior, wherein each monitoring circuit is connected to the host system and is configured to receive a location request signal transmitted from the first wireless communication device when engaging in communications with another party, and is further configured to communicate with the host system processor, wherein the location request signal is initiated to at least one of the plurality of monitoring circuits; wherein the host system processor creates route or guidance information and comprises means for sending the route or guidance information to the second wireless device, and wherein the second wireless device is in addition to the first wireless communications device. The route or guidance information is established for the present location of the second wireless communications device and an initial or reestablished location of the first wireless communications device.

A host system processor: wherein the host system processor is a component of a host building system within a building, wherein the host system processor is configured to communicate with a plurality of monitoring circuits, and wherein the plurality of monitoring circuits are located at known locations throughout the building interior, a first wireless communications device and a second wireless communications devices, wherein the first and second wireless communication devices are within the building, wherein the host system processor comprises means to communicate with the first and the second wireless communication device, wherein the second wireless communication device requests route or guidance information to travel to the location of the first wireless communications device, and wherein the host system processor creates route or guidance information and comprises means for sending the route or guidance information to the second wireless communication device.

A wireless communications device comprising, a transceiver configured to: communicate with other wireless devices in a wireless system via a voice channel, transmit a location request signal to one or more of a plurality of monitoring circuits, wherein the plurality of monitoring circuits are located at known locations throughout the interior of a building and are connected to a host system processor, wherein the wireless system includes a system antenna tower external to the building, and wherein the location request signal is distinct and separate from signals transmitted from the wireless communications device to the system antenna tower, and receive information wherein the information is either destination location information or waypoint information or both that are sent by the host system processor to the wireless communications device, and wherein, the wireless communications device creates route or guidance information based upon the received information, and wherein creating route or guidance information may include using a cloud based processor, using a cloud based navigation application or using other cloud based resources.

Embodiments for Wireless Communications Device Connectivity

One or more wireless communication devices may comprise a transceiver that is equipped to communicate with monitoring circuits that are connected to a host system processor wherein the host system processor is connected to a communications system. Thereby the one or more wireless communications devices may communicate with the communications system through the monitoring circuits and the host system processor, wherein the communications system comprises an internet system, a cellular phone system or a Wifi system.

A monitoring circuit to augment existing fire/smoke detectors by providing connectivity to the internet for the purpose of communications, location and navigation.

A monitoring circuit equipped with bi-directional communication with the internet through a host building system that is connected to the internet.

A monitoring circuit equipped to communicate with cell phones, Smartphones, portable radios, computers, tablets, medical devices, Smartwatches, and other compatible wireless communication devices.

A monitoring circuit equipped to function as an on or off ramp to the internet by connecting through a host building system comprising a wired or wireless network, a central control panel, a host system processor, a router, or other communications devices.

A monitoring circuit configured to provide location and navigation information for portable radio applications, m-commerce applications and remote medical monitoring applications.

A monitoring circuit configured to provide internet connectivity, wherein the internet connectivity may enable gaming, entertainment, and/or metaverse applications.

Part 15: General

What has been described herein includes examples of the disclosed system and embodiments. It is not possible to describe every conceivable combination of components and/or methods. Accordingly, the system and methods herein is intended to include all such alterations and combinations that are within the scope and spirit of the description and of the claims.

In addition the use of nouns and noun phrases to describe various components and actions may vary without any specific intent throughout the descriptions as they would likewise vary in ordinary conversation. Such variations should not be viewed as an opportunity to circumvent the intent herein to communicate the features and benefits of the methods and systems so disclosed.

Reference to handheld radios include all types or any type of portable and mobile radios used by emergency persons such as firefighters, police, medical personnel, and used by delivery persons, maintenance workers and other non-emergency workers. Radios disclosed herein have special signaling capability. The term "mobile radio" may replace the term "handheld radio" as used herein and vice versa. The term "portable radio" and/or "mobile radio" may replace the term "handheld radio" as used herein and vice versa.

The noun phrase, "electronic device units for detection of emergency calls," may also be referred to as electronic device unit for special signal detection, special signal monitoring devices, signal monitoring devices, monitoring devices, monitoring circuits, special signal detectors or simply as detectors.

The noun phrases "cell phone," "personal wireless device" and "wireless device" are intended to refer to devices that may operate within a cell phone system and/or wireless network. In many cases these devices are assumed to have Wifi and Bluetooth capabilities. For the purposes of this disclosure, they are also assumed to have special signaling capability.

References to cellular network towers and/or cell towers is a general reference to a local cellular network receiving and transmitting equipment whether installed on a tower or otherwise installed in a location that does not necessarily include a tower or a tower like structure.

References to software within a wireless device or a system processor may include firmware algorithms and routines, hardware algorithms and routines, software applications, cloud based applications or other algorithms and routines.

The noun phrases "host system control panel," "host system controller" and "host system processor" have been used interchangeably to refer to the processing and control element of a host system.

In the claims and description, the term "each" does not necessarily mean "all." For example, if a system includes a plurality of antennas (e.g., at least two antennas), wherein each antenna includes a horn antenna, this means that each of the previously-referenced plurality of antennas (e.g., at least two antennas) include a horn antenna and not that each antenna in the system includes a horn antenna.

The invention claimed is:

1. A system comprising:
a first wireless communications device;
a second wireless communications device;
a host system, wherein the host system comprises a host system processor; and
a plurality of monitoring circuits,
wherein the plurality of monitoring circuits are located at known locations throughout a building interior,
wherein each monitoring circuit is connected to the host system and is configured to receive a location request signal transmitted from the first wireless communication device when engaging in communications with another party, and is further configured to communicate with the host system processor,
wherein the location request signal is initiated to at least one of the plurality of monitoring circuits,
wherein the host system processor creates route or guidance information and comprises a transceiver to send the route or guidance information to the second wireless device, and
wherein the second wireless device is in addition to the first wireless communications device.

2. The system of claim 1 further comprising,
a plurality of data modems,
wherein each data modem is associated with a corresponding monitoring circuit, and
wherein, in response to the corresponding monitoring circuit receiving the location request signal, each data modem is configured to send a data signal indicative of the location of the respective monitoring circuit to the host system processor.

3. The system of claim 1,
wherein the route or guidance information is established for the present location of the second wireless communications device and an initial or reestablished location of the first wireless communications device.

4. The system of claim 1,
wherein, the host system is a fire alarm system, a Supervisory Control and Data Acquisition (SCADA), internet access system, access control system, or other building monitoring system.

5. The system of claim 1,
wherein the transceiver is associated with a monitoring circuit, an auxiliary transceiver, or a Wifi system.

6. The first wireless communication device of claim 1,
wherein the first wireless communication device comprises a processor, and
wherein the processor is configured to select one of the plurality of monitoring circuits for additional communications based upon a criteria for the transmitted location request signal.

7. The system of claim 1, further comprising:
a plurality of transceivers,
wherein each transceiver is associated with a corresponding monitoring circuit, and
wherein, in response to the corresponding monitoring circuit receiving the location request signal from the first wireless communications device, each transceiver is configured to send a data signal to the first wireless communications device for the first wireless communications device to select one of the plurality of monitoring circuits for additional communications.

8. The system of claim 7, further comprising:
a plurality of data modems,
wherein the plurality of data modems communicate with a host system processor;
wherein each data modem is associated with a corresponding monitoring circuit, and
wherein, in response to the corresponding monitoring circuit being selected by the first wireless communications device for additional communications, each data modem is configured to send data indicative of the location of the respective monitoring circuit or data indicative of the location of the first wireless communications device to the host system processor.

9. The system of claim 8,
wherein the host system processor is connected to a communication system,
wherein the first wireless communications device communicates with the communication system through the host system processor, and
wherein the communication system comprises an internet system, a cellular phone system or a Wifi system.

10. A host system processor:
wherein the host system processor is a component of a host building system within a building,
wherein the host system processor is configured to communicate with a plurality of monitoring circuits, and
wherein the plurality of monitoring circuits are located at known locations throughout the building interior,
a first wireless communications device; and
a second wireless communications device,
  wherein the first and second wireless communication devices are within the building,
  wherein the host system processor comprises means to communicate with the first and the second wireless communication devices,
  wherein the second wireless communication device requests route or guidance information to travel to the location of the first wireless communications device, and
wherein the host system processor creates route or guidance information and comprises means for sending the route or guidance information to a user of the second wireless communication device.

11. The host system processor of claim 10,
wherein, each monitoring circuit comprises a modem that is connected to the host system processor and each modem is configured to communicate with the host system processor.

12. The host system processor of claim 10,
wherein the means for sending comprises being transmitted by one or more monitoring circuits, being transmitted by an auxiliary transceiver, being transmitted by a Wifi system, being displayed on a visual display, or being announced by a loudspeaker.

13. The host system processor of claim 10,
wherein the route or guidance information is established for the present location of the second wireless communications device and an initial or reestablished location of the first wireless communications device.

14. The host system processor of claim 10,
wherein the second wireless communication device is a portable radio in a trunked radio system.

15. The host system processor of claim 10,
wherein the host system processor is connected to a communication system,
wherein the first wireless communications device or second wireless communications device communicates with the communication system through the host system processor and
wherein the communication system comprises an internet system, a cellular phone system or a Wifi system.

16. A wireless communications device comprising,
a transceiver configured to:
  communicate with other wireless devices in a wireless system via a voice channel,
  transmit a location request signal to one or more of a plurality of monitoring circuits,
    wherein the plurality of monitoring circuits are located at known locations throughout the interior of a building and are connected to a host system processor,
    wherein the wireless system includes a system antenna tower external to the building, and
    wherein the location request signal is distinct and separate from signals transmitted from the wireless communications device to the system antenna tower, and
  receive information wherein the information is either destination location information or waypoint information or both that are sent by the host system processor to the wireless communications device,
  wherein, the wireless communications device creates route or guidance information based upon the received information.

17. The wireless communications device of claim 16,
wherein the wireless communications device is a portable radio in a trunked radio system.

18. The wireless communications device of claim 16,
wherein the wireless communications device comprises means to communicate with the host system processor,
wherein the host system processor is connected to a communication system,
wherein the wireless communications device communicates with the communication system through the host system processor, and
wherein the communication system comprises an internet system, a cellular phone system or a Wifi system.

19. The wireless communications device of claim 16,
wherein the means for receiving the destination location or waypoint information from the host system processor comprises means for receiving from one or more monitoring circuits, means for receiving from an auxiliary transmitter, or means for receiving from a Wifi system.

20. The wireless communications device of claim 16,
wherein the destination location is the location of a separate and distinct wireless communications device.

21. The wireless communications device of claim 16,
wherein creating route or guidance information includes using a cloud based processor, using a cloud based navigation application or using other cloud based resources.

* * * * *